US011055542B2

(12) United States Patent
Tohriyama et al.

(10) Patent No.: US 11,055,542 B2
(45) Date of Patent: Jul. 6, 2021

(54) CROSSWALK MARKING ESTIMATING DEVICE

(71) Applicants: TOYOTA JIDOSHA KABUSHIKI KAISHA, Toyota (JP); THE UNIVERSITY OF TOKYO, Tokyo (JP)

(72) Inventors: Kyoichi Tohriyama, Yokohama (JP); Minoru Kamata, Tokyo (JP); Takuma Ito, Tokyo (JP)

(73) Assignees: TOYOTA JIDOSHA KABUSHIKI KAISHA, Toyota (JP); THE UNIVERSITY OF TOKYO, Tokyo (JP)

( * ) Notice: Subject to any disclaimer, the term of this patent is extended or adjusted under 35 U.S.C. 154(b) by 114 days.

(21) Appl. No.: 16/519,400

(22) Filed: Jul. 23, 2019

(65) Prior Publication Data
US 2020/0117919 A1 Apr. 16, 2020

(30) Foreign Application Priority Data
Oct. 11, 2018 (JP) .............................. JP2018-192668

(51) Int. Cl.
*G06K 9/00* (2006.01)
*G06T 7/70* (2017.01)

(52) U.S. Cl.
CPC ............ *G06K 9/00798* (2013.01); *G06T 7/70* (2017.01); *G06T 2207/30256* (2013.01)

(58) Field of Classification Search
CPC ............ G06T 7/70; G06T 2207/30256; G06K 9/00798
See application file for complete search history.

(56) References Cited

U.S. PATENT DOCUMENTS

| 2017/0337432 A1* | 11/2017 | Maeda | G01S 13/931 |
| 2018/0107884 A1* | 4/2018 | Kinoshita | G06K 9/00798 |
| 2020/0117919 A1* | 4/2020 | Tohriyama | G06K 9/4609 |

FOREIGN PATENT DOCUMENTS

| EP | 2838051 A2 | 2/2015 |
| JP | 2005-339468 A | 12/2005 |
| JP | 2015-036984 A | 2/2015 |

OTHER PUBLICATIONS

Suzuki, S.et al., "Sensor Fusion-Based Pedestrian Collision Warning System with Crosswalk Detection", Proceedings of 2010, IEEE Intelligent Vehicles Symposium (2010), pp. 355-360.
(Continued)

Primary Examiner — Md K Talukder
(74) Attorney, Agent, or Firm — Sughrue Mion, PLLC

(57) ABSTRACT

A crosswalk marking estimating device includes: circuitry configured to: create a planar-view road surface image of a road around a vehicle; acquire end candidates which are candidates for ends of the bands, included in a crosswalk marking, in the planar-view road surface image based on the planar-view road surface image and a template image which is stored in advance; select a plurality of selected end candidates which is a set of the end candidates corresponding to an edge on the one side, in the road extending direction, of the crosswalk marking from a distribution of the end candidates in the road extending direction in the planar-view road surface image; and estimate a position of the edge of the crosswalk marking relative to the vehicle based on the selected end candidates.

6 Claims, 18 Drawing Sheets

(56) References Cited

OTHER PUBLICATIONS

Haselhoff, A. et al., "On Visual Crosswalk Detection for Driver Assistance Systems", Proceedings of 2010, IEEE Intelligent Vehicles Symposium (2010), pp. 883-888.
Sichelschmidt, S. et al., "Pedestrian Crossing Detecting as a part of an Urban Pedestrian Safety System", Proceedings of 2010, IEEE Intelligent Vehicles Symposium (2010), pp. 840-844.
Foucher, P. et al., "Detection and Recognition of Urban Road Markings Using Images", Proceedings of 2011 14th, International IEEE Conference on Intelligent Transportation Systems (2011), pp. 1747-1752.
Zhai, Y. et al., "Crosswalk Detection Based on MSER and ERANSAC", Proceedings of 2015 18th, International IEEE Conference on Intelligent Transportation Systems (2015), pp. 2770-2775.

* cited by examiner

FIG. 15
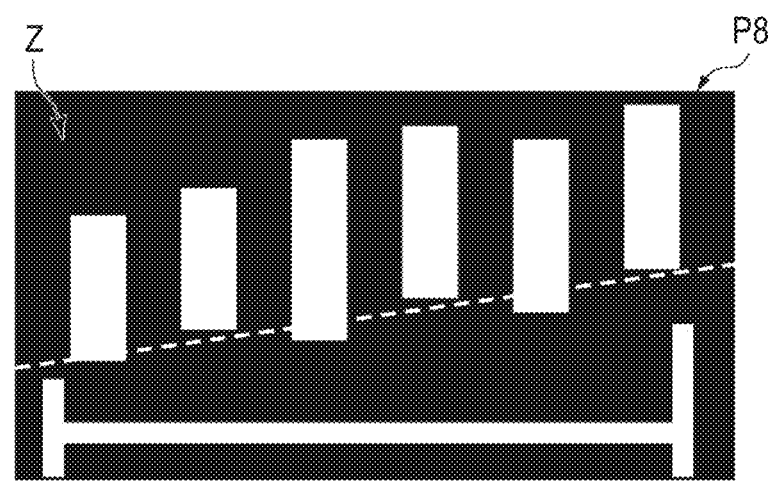
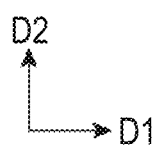

CROSSWALK MARKING ESTIMATING DEVICE

INCORPORATION BY REFERENCE

The disclosure of Japanese Patent Application No. 2018-192668 filed on Oct. 11, 2018 including the specification, drawings and abstract is incorporated herein by reference in its entirety.

BACKGROUND

1. Technical Field

The present disclosure relates to a crosswalk marking estimating device.

2. Description of Related Art

A device that estimates a position of a crosswalk marking including a plurality of bands is known. For example, Japanese Unexamined Patent Application Publication No. 2005-339468 (JP 2005-339468 A) discloses a device that extracts edge points from an image of a road in front of a vehicle and estimates a position of an edge of a crosswalk marking in a direction in which the road extends based on a line segment passing through the extracted edge points.

SUMMARY

In the above-mentioned device, for example, when a crosswalk marking is not clear due to wear or the like, there is a likelihood that an edge point of the crosswalk marking will not be able to be appropriately extracted from an image and estimation accuracy of a position of the crosswalk marking will decrease.

Therefore, the present disclosure provides a crosswalk marking estimating device that can curb a decrease in estimation accuracy of a position of a crosswalk marking even when the crosswalk marking is not clear.

A crosswalk marking estimating device according to an aspect of the present disclosure estimates a position of a crosswalk marking including a plurality of bands. The crosswalk marking estimating device includes circuitry configured to: create a planar-view road surface image of a road around a vehicle based on a result of detection from an onboard sensor; acquire end candidates which are candidates for ends of the bands in the planar-view road surface image based on the planar-view road surface image and a template image which is stored in advance, the template image being a model image of ends on one side, in a road extending direction, of the bands included in the crosswalk marking; select a plurality of selected end candidates which is a set of the end candidates corresponding to an edge on the one side, in the road extending direction, of the crosswalk marking from a distribution of the end candidates in the road extending direction in the planar-view road surface image; and estimate a position of the edge of the crosswalk marking relative to the vehicle based on the selected end candidates.

According to various aspects of the present disclosure, it is possible to curb a decrease in estimation accuracy of a position of a crosswalk marking even when the crosswalk marking is not clear.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 15 is a diagram illustrating an example of an inclined crosswalk;

DETAILED DESCRIPTION OF EMBODIMENTS

Figure 1:
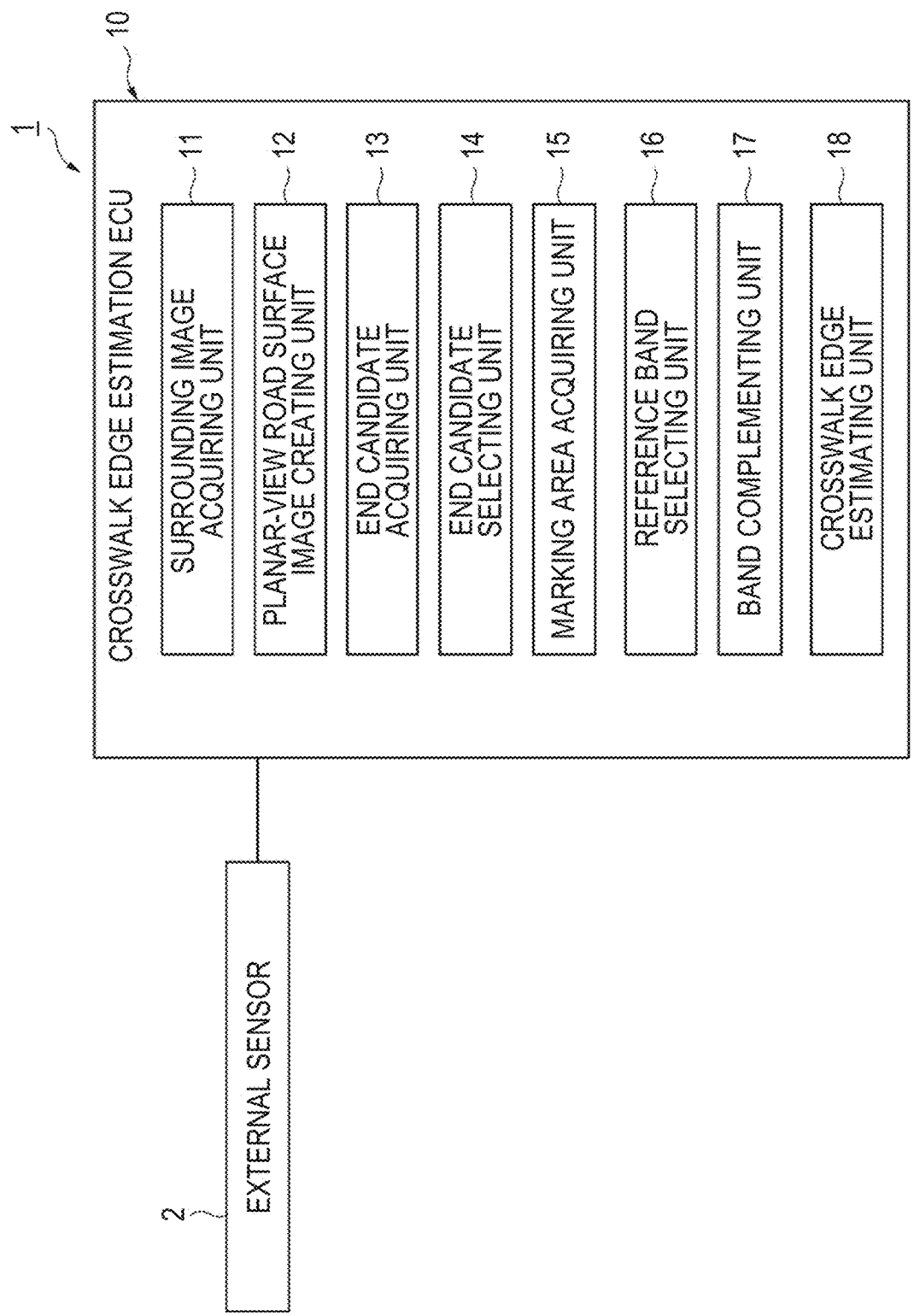
FIG. 1 is a block diagram illustrating a crosswalk marking estimating device according to a first embodiment.

Hereinafter, exemplary embodiments will be described with reference to the accompanying drawings. The same or corresponding elements in the drawings will be referred to by the same reference signs and description thereof will not be repeated.

First Embodiment

FIG. 1 is a block diagram illustrating a crosswalk marking estimating device 1 according to a first embodiment. As illustrated in FIG. 1, the crosswalk marking estimating device 1 is a device that is mounted in a vehicle such as an automobile and estimates a position of a crosswalk marking Z including a plurality of bands B based on results of detection using onboard sensors (see FIG. 2).

Figure 3:
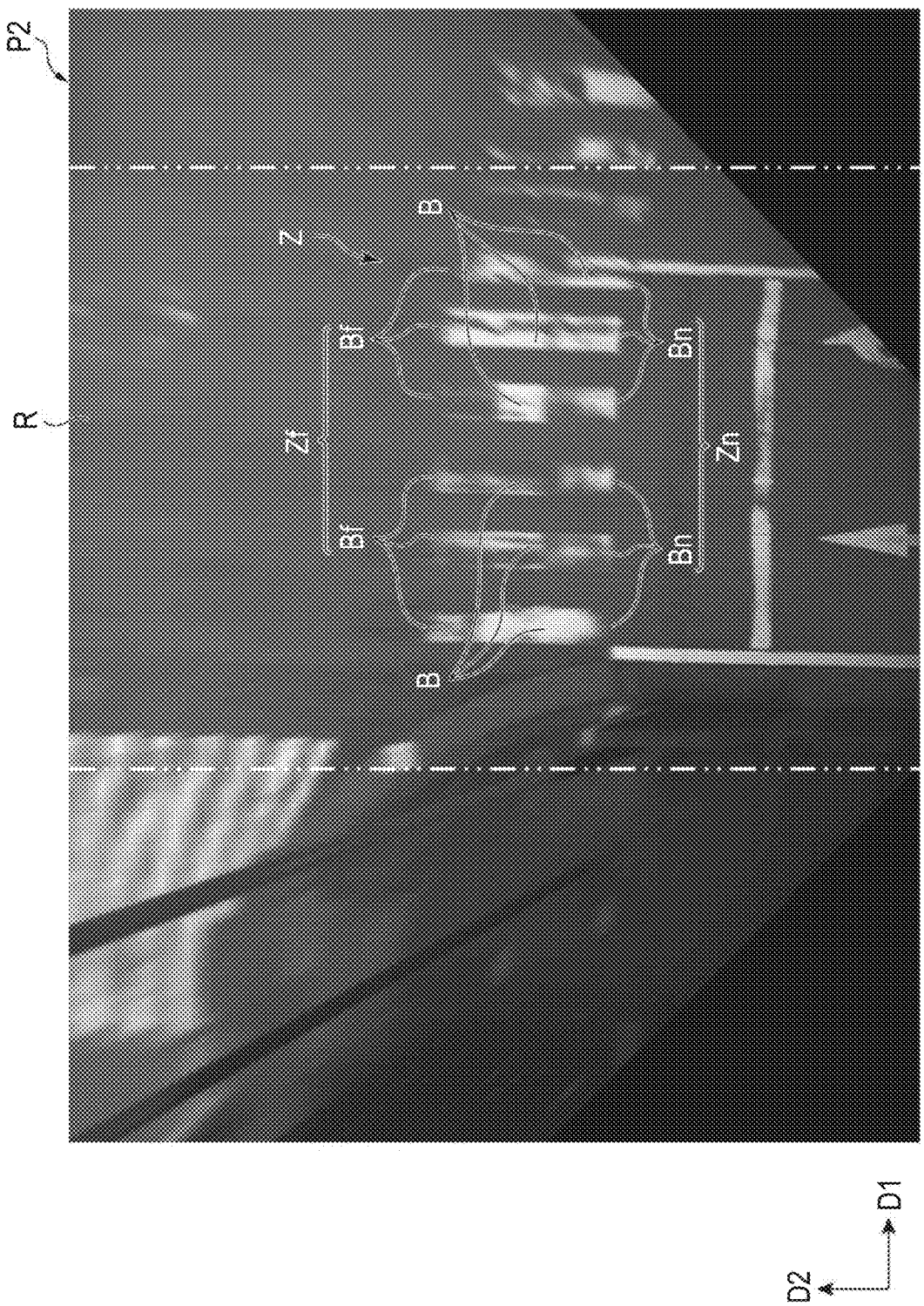
FIG. 3 is a diagram illustrating a planar-view road surface image of a road in front of a vehicle.

A "crosswalk marking Z" is a road marking in which a plurality of bands B is arranged to be separated from each other from one side to the other side in a road width direction D1 of a road R (see FIG. 3). The crosswalk marking Z is a crosswalk zone for pedestrians on a road R. Each band B has a tetragonal shape (a rectangular shape herein) which extends in a road extending direction D2. In this embodiment, the bands B are marked on the road R such that near-side ends (one-side ends) Bn in the road extending direction D2 of the bands B are arranged in a line which is substantially parallel to the road width direction D1. The ends Bn of the bands B form a near-side edge (one-side edge) Zn in the road extending direction D2 of the crosswalk marking Z. The crosswalk marking Z may be worn down, for example, by vehicles or the like running on the road R that run over the crosswalk marking Z. In this embodiment, the bands B of the crosswalk marking Z are partially worn down. In this embodiment, an aspect in which an edge Zn on a near side in the road extending direction D2 of a crosswalk marking Z is estimated by the crosswalk marking estimating device 1 will be described, but the crosswalk marking estimating device 1 can be similarly applied to an aspect in which an edge Zf on a far side in the road extending direction D2 of the crosswalk marking Z is estimated.

The crosswalk marking estimating device 1 includes a crosswalk edge estimation electronic control unit (ECU) 10. The crosswalk edge estimation ECU 10 is connected to an external sensor (an onboard sensor) 2.

The external sensor 2 is a detection device that detects external conditions of a vehicle. The external sensor 2 includes, for example, a camera. The external conditions of the vehicle which are detected by the external sensor 2 include road information (for example, a crosswalk marking Z) around a vehicle V.

Figure 2:
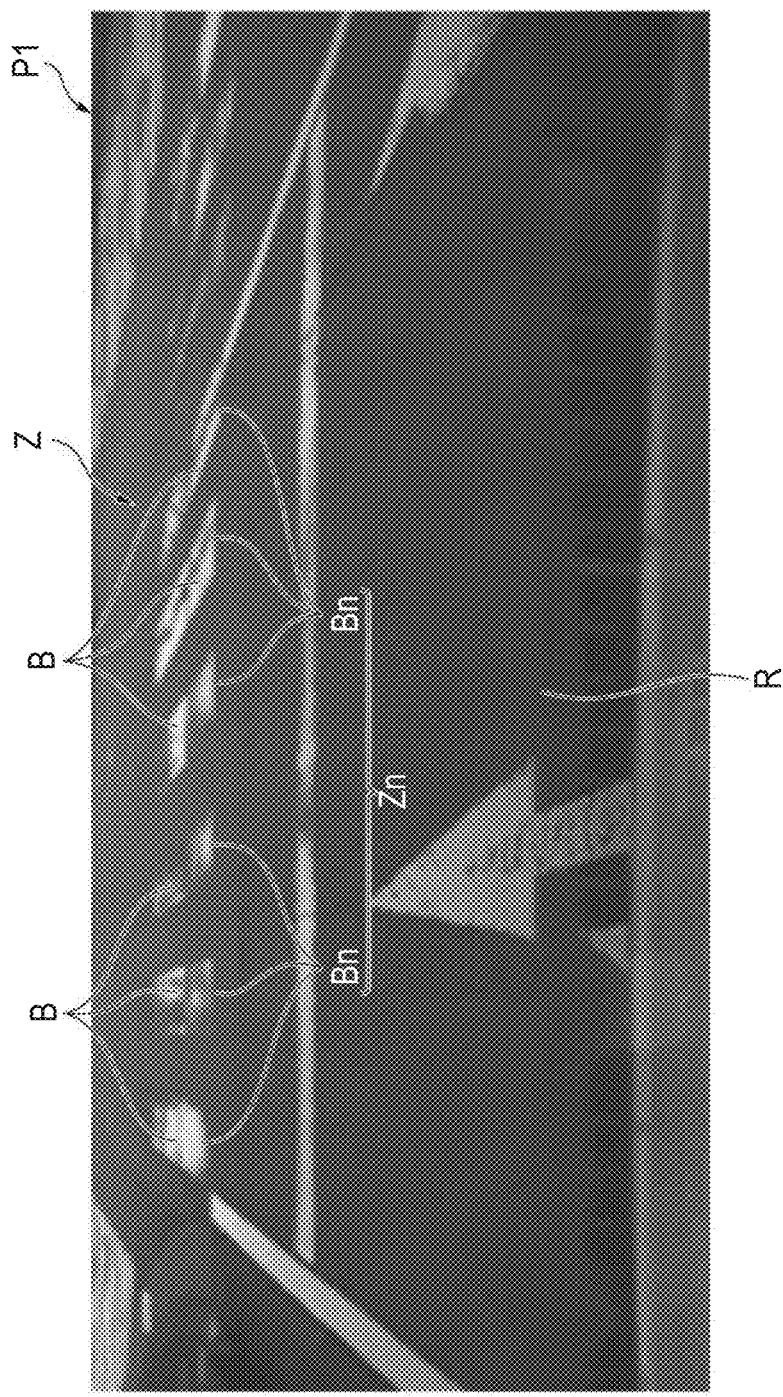
FIG. 2 is a diagram illustrating an image obtained by imaging a scene in front of a vehicle.

The camera is an imaging device that images external conditions of the vehicle and more specifically captures an image P1 of a scene in front of the vehicle (see FIG. 2). For example, the camera is installed on an interior side of a front windshield of the vehicle. The camera transmits imaging information on the external conditions of the vehicle to the crosswalk edge estimation ECU 10. The camera may be a monocular camera or a stereoscopic camera. The stereoscopic camera includes two imaging units which are arranged to reproduce binocular parallax. The imaging information of the stereoscopic camera includes information in a depth direction.

The crosswalk edge estimation ECU 10 is an electronic control unit that comprehensively controls the device. The crosswalk edge estimation ECU 10 includes a central processing unit (CPU), a read only memory (ROM), and a random access memory (RAM). The crosswalk edge estimation ECU 10 realizes various functions, for example, by loading a program stored in the ROM into the RAM and causing the CPU to execute the program loaded into the RAM. The crosswalk edge estimation ECU 10 may be constituted by a plurality of ECUs. Some functions of the crosswalk edge estimation ECU 10 may be realized by a server that can communicate with the vehicle.

The crosswalk edge estimation ECU 10 includes a surrounding image acquiring unit 11, a planar-view road surface image creating unit 12, an end candidate acquiring unit 13, an end candidate selecting unit 14, a marking area acquiring unit 15, a reference band selecting unit 16, a band complementing unit 17, and a crosswalk edge estimating unit 18 as functional units.

The surrounding image acquiring unit 11 receives imaging information in front of the vehicle from the camera and acquires an image P1 in front of the vehicle. FIG. 2 is a diagram illustrating an image P1 obtained by imaging a scene in front of the vehicle. The surrounding image acquiring unit 11 acquires an image P1 in front of the vehicle, for example, as illustrated in FIG. 2. In FIG. 2, a crosswalk marking Z which is partially worn down is marked on a road R in front of the vehicle.

The planar-view road surface image creating unit 12 creates a planar-view road surface image P2 of a road around the vehicle (here, in front of the vehicle) from results of detection from the external sensor 2. More specifically, the planar-view road surface image creating unit 12 acquires an image P1 in front of the vehicle acquired by the camera from the surrounding image acquiring unit 11 and creates a planar-view road surface image P2 in front of the vehicle based on the acquired image P1. FIG. 3 is a diagram illustrating a planar-view road surface image P2 of a road R in front of the vehicle. As illustrated in FIGS. 2 and 3, the planar-view road surface image creating unit 12 creates the planar-view road surface image P2 (FIG. 3) of the road R in front of the vehicle, for example, by performing inverse projection transformation on the image P1 obtained by imaging a scene in front of the vehicle (FIG. 2) in consideration of an attachment orientation (an attachment angle) of the camera to the vehicle.

The planar-view road surface image creating unit 12 extracts an area in which the crosswalk marking Z is included (an area with a high likelihood of including the crosswalk marking Z) as a detection region of interest (ROI) from the created planar-view road surface image P2 of the road R in front of the vehicle. The "detection ROI" is an area from which the crosswalk marking Z is to be detected on the road R. By setting the detection ROI, it is possible to reduce an amount of calculation for a crosswalk edge estimating process in the crosswalk marking estimating device 1 and to reduce noise at the time of calculation. Here, the planar-view road surface image creating unit 12 extracts a preset range in the road width direction D1 of an area which is interposed between two alternate long and two short dashes lines in FIG. 3 as the detection ROI. When the image P1 obtained by imaging a scene in front of the vehicle is a color image, the planar-view road surface image creating unit 12 may further perform monochrome conversion on the image P1. When the size of the image P1 obtained by imaging a scene in front of the vehicle is larger than necessary, the planar-view road surface image creating unit 12 may further perform a process of reducing the image size on the image P1.

Figure 4:
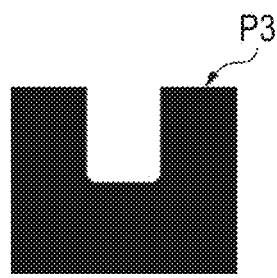
FIG. 4 is a diagram illustrating a template image for detecting ends of bands.
Figure 5:
FIG. 5 is a diagram illustrating a similarity map indicating a degree of similarity to an end of each band in a planar-view road surface image.
Figure 6:
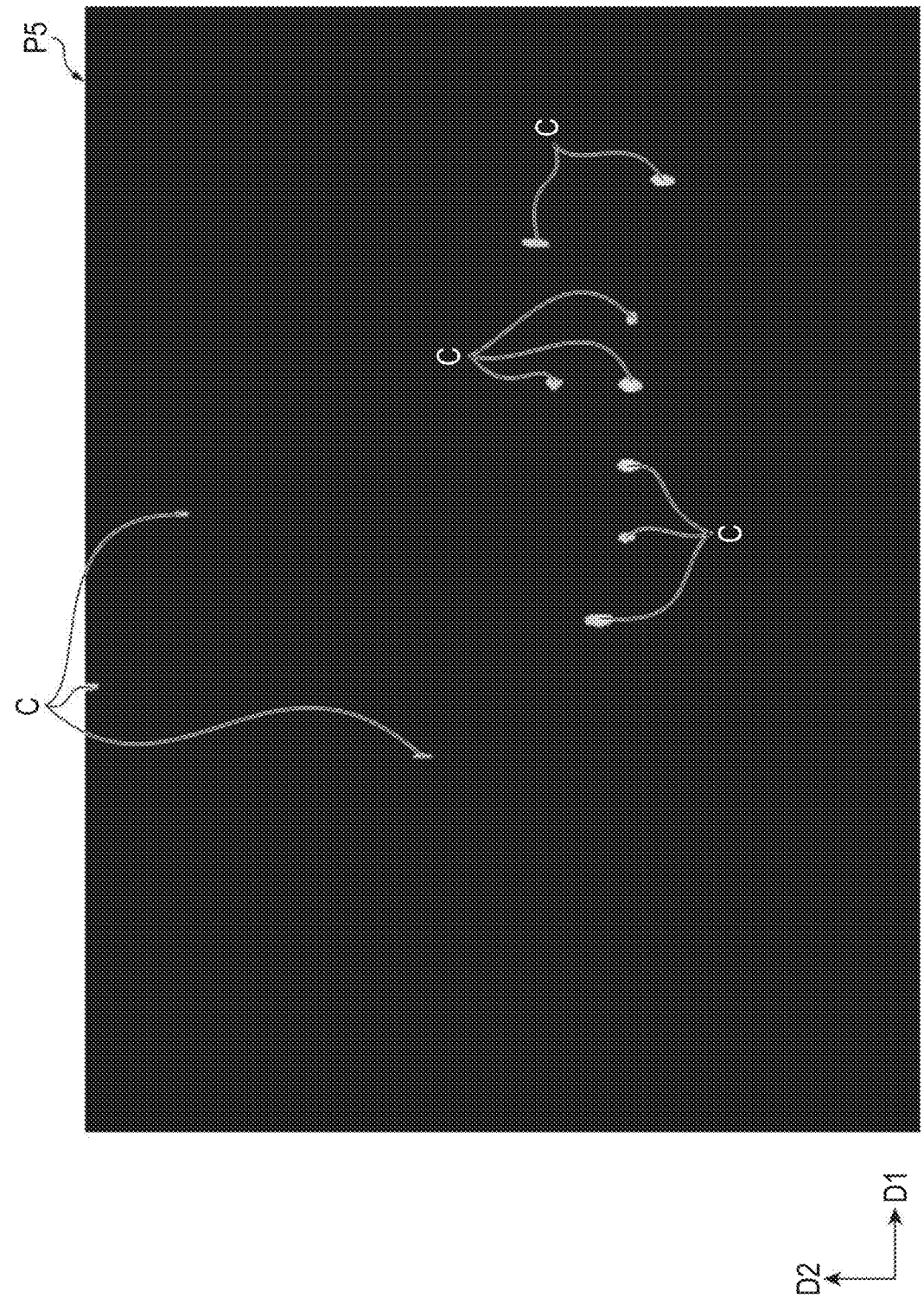
FIG. 6 is a diagram illustrating end candidates for bands in a planar-view road surface image.

The end candidate acquiring unit 13 acquires end candidates C in the planar-view road surface image P2. "End candidate C" refers to a candidate for an end Bn of each band B. FIG. 4 is a diagram illustrating a template image P3 for detecting ends Bn of bands B. FIG. 5 is a diagram illustrating a similarity map P4 indicating a degree of similarity to an end Bn of a band B in the planar-view road surface image P2. FIG. 6 is a diagram illustrating end candidates C of the bands B in the planar-view road surface image P2. As illustrated in FIG. 4, the end candidate acquiring unit 13 stores a template image P3 for detecting ends Bn of bands B in advance. The end candidate acquiring unit 13 acquires the similarity map P4 illustrated in FIG. 5 by performing a known process such as template matching based on the planar-view road surface image P2 and the template image P3. In the similarity map P4 illustrated in FIG. 5, a position at which the degree of similarity to the template image P3 is higher (that is, a position at which there is a higher likelihood that an end Bn of a band B will be present) in the planar-view road surface image P2 is displayed in a whiter shade.

The end candidate acquiring unit 13 performs a threshold value process on the similarity map P4 illustrated in FIG. 5. More specifically, the end candidate acquiring unit 13 creates an end candidate map P5 in which an area in which the degree of similarity is equal to or greater than a preset threshold value is left for the similarity map P4 as illustrated in FIG. 6. The end candidate acquiring unit 13 detects points at which the degree of similarity is locally maximized in an area in which the degree of similarity is equal to or greater than the preset threshold value (that is, an area which is marked in white in the end candidate map P5) in the similarity map P4 and acquires the points as end candidates C. Here, a point is, for example, one pixel in an image.

The end candidate selecting unit 14 selects selected end candidates Cs from a grouping state in the road extending direction D2 of the end candidates C based on a distribution in the planar-view road surface image P2 of the end candidates C acquired by the end candidate acquiring unit 13. The "selected end candidates Cs" are end candidates C corresponding to the edge Zn of the crosswalk marking Z. That is, the end candidates C are points which are acquired simply based on a degree of similarity in shape to the template image P3 by template matching between the planar-view road surface image P2 and the template image P3, and the selected end candidates Cs are the end candidates C, which are selected from the end candidates C, corresponding to the edge Zn of the crosswalk marking Z. The "grouping state" is a state of a degree to which the end candidates C are concentrated at positions in the road extending direction D2. For example, the grouping state may be an integrated value which is obtained by integrating the end candidates C in the road width direction D1 along the positions in the road extending direction D2. For example, the grouping state may be weighted in the road extending direction D2 or may have a degree of similarity of each end candidate C reflected therein.

Figure 7:
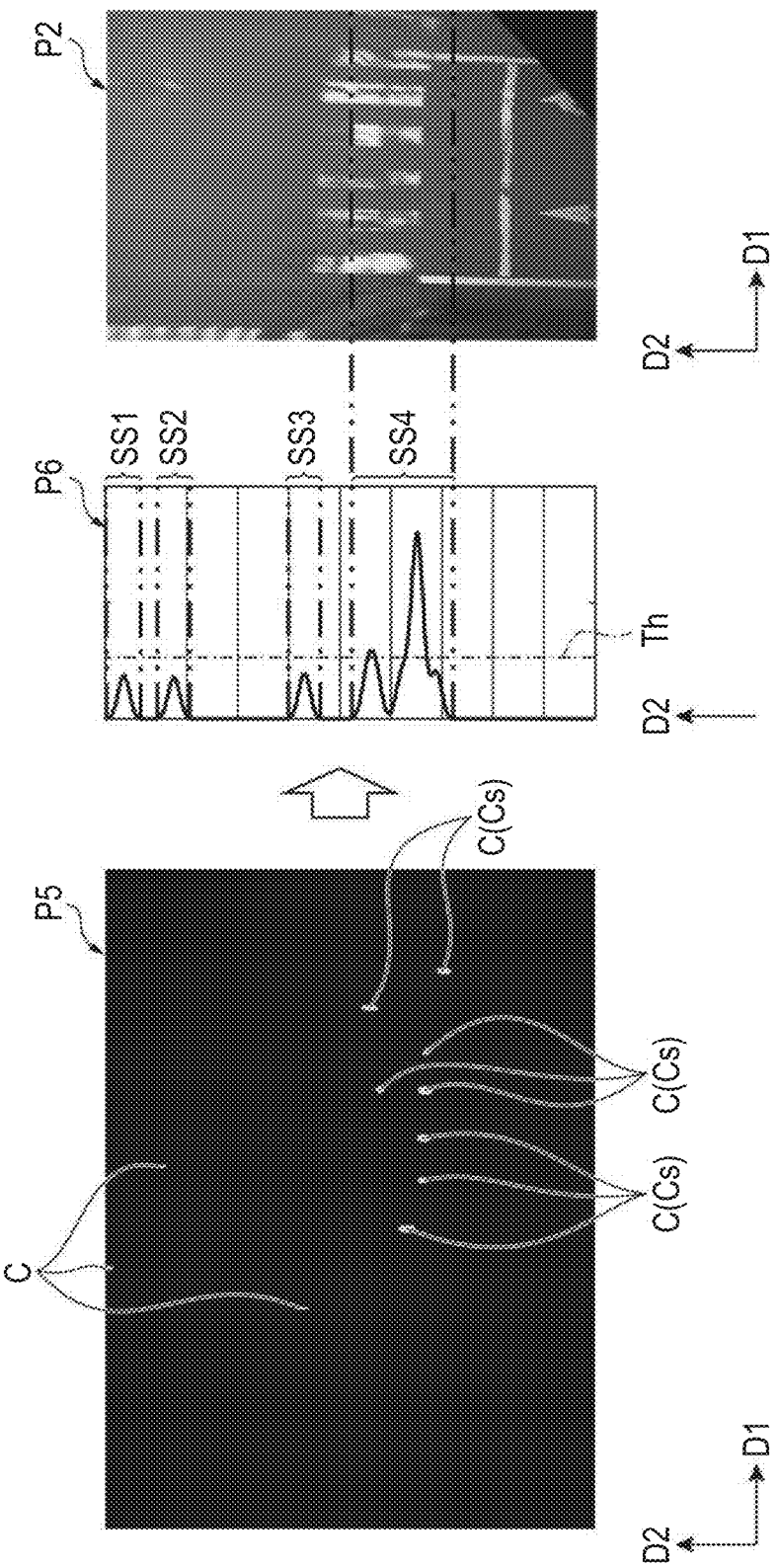
FIG. 7 is a diagram illustrating a grouping state in a road extending direction of end candidates.
Figure 8:
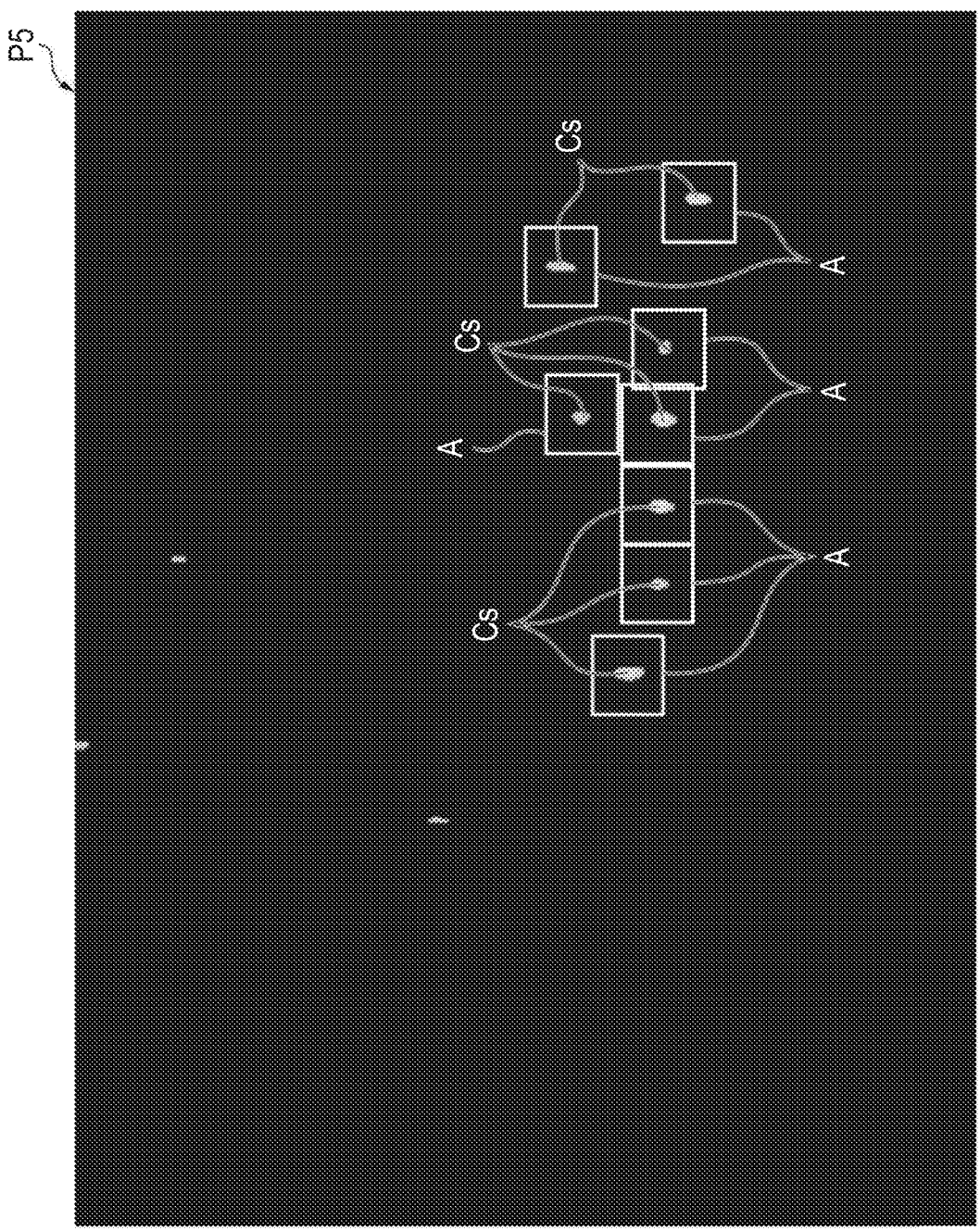
FIG. 8 is a diagram illustrating selected end candidates which are selected from end candidates.

An example of a process of selecting the selected end candidates Cs from the end candidates C using the end candidate selecting unit 14. FIG. 7 is a diagram illustrating a grouping state in the road extending direction D2 of the end candidates C. FIG. 8 is a diagram illustrating the selected end candidates Cs selected from the end candidates C. As illustrated in FIGS. 7 and 8, the end candidate selecting unit 14 performs weighting of a normal distribution in the road extending direction D2 using a Gaussian kernel on the degrees of similarity of the end candidates C and integrates the weighted values in the road width direction D1 (see a histogram P6 illustrated in FIG. 7). In other words, the end candidate selecting unit 14 acquires the grouping state in the road extending direction D2 of the end candidates C.

Subsequently, the end candidate selecting unit 14 divides the histogram P6 illustrated in FIG. 7 into sections of continuous parts (in which the values obtained by weighting the degrees of similarity and integrating the weighted values are not zero but are continuous). In FIG. 7, the histogram P6 is divided into sections SS1, SS2, SS3, and SS4 sequentially from a far side opposite to the near side in the road extending direction D2. The end candidate selecting unit 14 detects a section including a peak of which the vertex height is equal to or greater than a preset threshold value Th out of these sections. In FIG. 7, the vertex height of the peak included in the section SS4 is equal to or greater than the preset threshold value Th, and the vertex heights of the peaks included in the sections other than the section SS4 are less than the preset threshold value Th. This means that the end candidates C in the section SS4 are concentrated in the road extending direction D2 and there is a high likelihood that the edge Zn of the crosswalk marking Z will be present in the section SS4. The end candidate selecting unit 14 selects the end candidates C included in the section SS4 as the selected end candidates Cs.

The marking area acquiring unit 15 acquires similar areas of the selected end candidates Cs which extend continuously from the selected end candidates Cs selected by the end candidate selecting unit 14 in the planar-view road surface image P2 as marking areas M of the bands B. The "similar areas of the selected end candidates Cs" are areas having a state similar to the selected end candidates Cs in the planar-view road surface image P2. For example, in the planar-view road surface image P2, a similar area of a selected end candidate Cs may be an area in which a difference in luminance in an image from the luminance (for example, an average luminance) of the selected end candidate Cs is in a preset range or may be an area in which a hue, a lightness, and a saturation, or the like in the image with respect to the selected end candidate Cs is within a preset range. Here, a similar area of a selected end candidate Cs is an area in which wear or the like is little and a band B associated with the selected end candidate Cs is determined to be marked clearly based on the luminance, the hue, the lightness, the saturation, or the like in the planar-view road surface image P2. The "similar area of a selected end candidate Cs extending continuously from the selected end candidate Cs" is an area from the selected end candidate Cs in the planar-view road surface image P2 to a boundary between an area in which wear or the like is relatively little and the band B is marked relatively clearly and an area in which the band B is not marked due to wear or the like.

Figure 9:
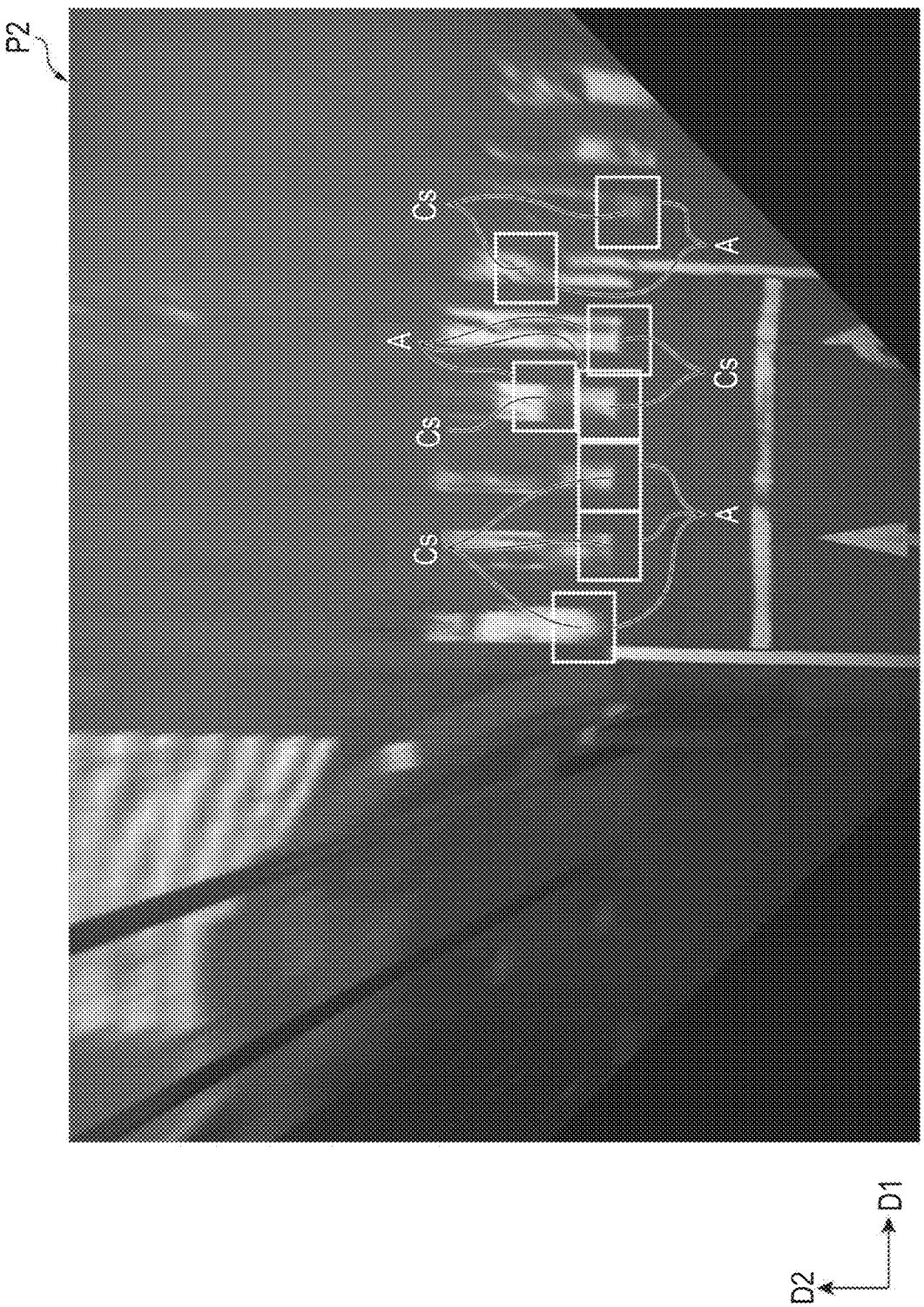
FIG. 9 is a diagram illustrating positions of selected end candidates in a planar-view road surface image.
Figure 10:
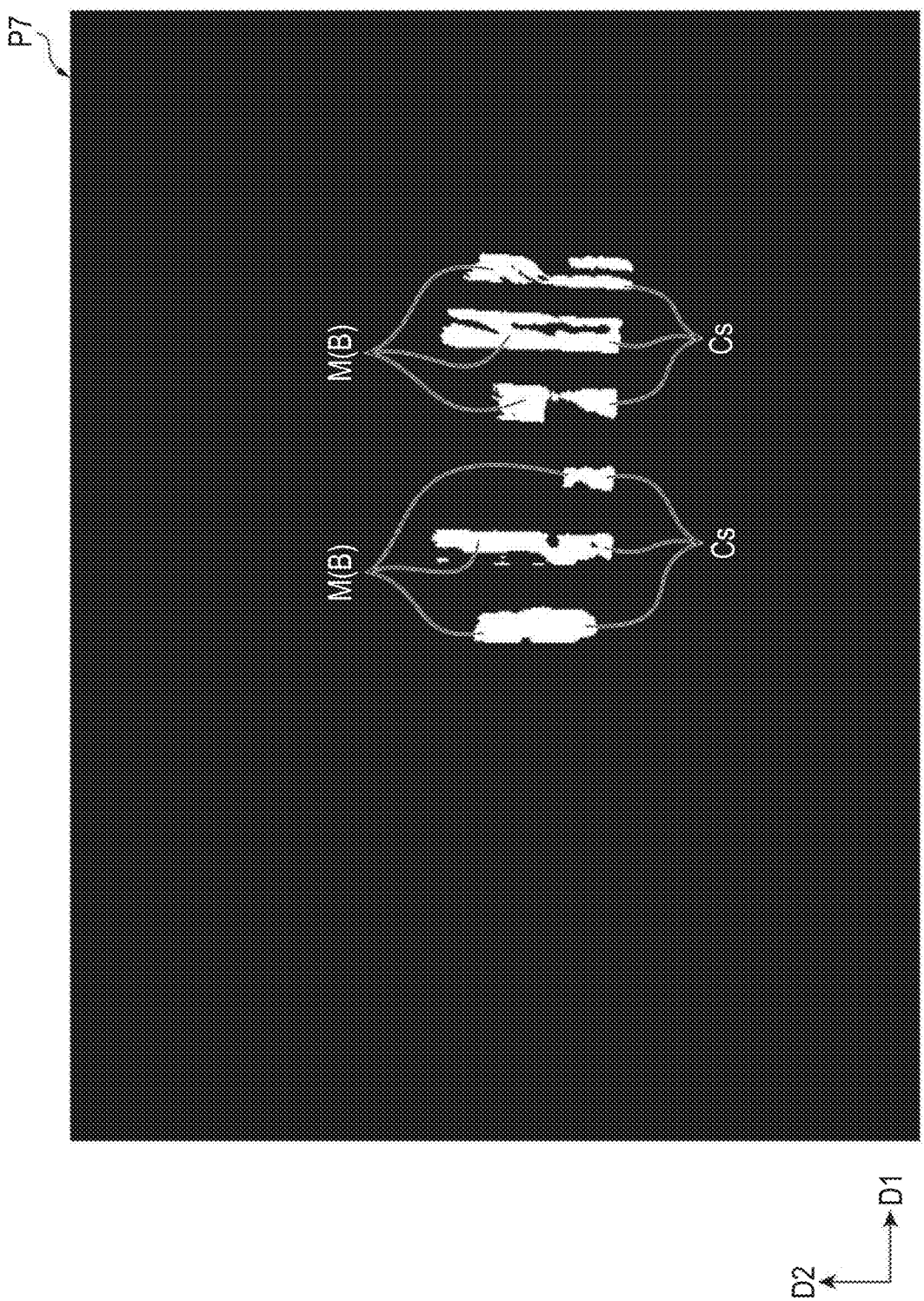
FIG. 10 is a diagram illustrating marking areas of bands extending continuously from selected end candidates.

An example of a process of acquiring a marking area M of a band B extending continuously from each selected end candidate Cs in the planar-view road surface image P2 using the marking area acquiring unit 15 will be described below. FIG. 9 is a diagram illustrating positions of the selected end candidates Cs in the planar-view road surface image P2. FIG. 10 is a diagram illustrating marking areas M of the bands B extending continuously from the selected end candidates Cs. As illustrated in FIGS. 9 and 10, the marking area acquiring unit 15 sets a binarization target area A around each selected end candidate Cs selected by the end candidate selecting unit 14 in the end candidate map P5. Here, the marking area acquiring unit 15 sets a square area with a predetermined size centered on each selected end candidate Cs as the binarization target area A.

Subsequently, the marking area acquiring unit 15 sets a threshold value with which the inside of each binarization target area A can be appropriately binarized (hereinafter referred to as a "binarization threshold value") based on the degrees of similarity in the binarization target area A set in the planar-view road surface image P2. For example, the marking area acquiring unit 15 may set a binarization threshold value corresponding to each binarization target area A based on an Otsu method (a discrimination analysis method).

First, the marking area acquiring unit 15 acquires a binarization threshold value for the binarization target area A corresponding to one selected end candidate Cs. The marking area acquiring unit 15 binarizes the entire planar-view road surface image P2 based on the acquired binarization threshold value. Then, the marking area acquiring unit 15 acquires a marking area M of the band B extending continuously from the selected end candidate Cs which is an object in the current process based on the binarized planar-view road surface image P2. Accordingly, an area, in which wear or the like is little and the band B is marked relatively clearly, of the band B which is an object in the current process out of the plurality of bands B is acquired as the marking area M of the band B.

Then, the marking area acquiring unit 15 acquires the binarization threshold value for the binarization target area A corresponding to another selected end candidate Cs other than the selected end candidate Cs which is an object in the previous process and binarizes the entire planar-view road surface image P2 based on the acquired binarization threshold value. The marking area acquiring unit 15 acquires the marking area M of the band B extending continuously from the selected end candidate Cs which is an object in the current process based on the binarized planar-view road surface image P2. Thereafter, by repeatedly performing the same process on another selected end candidate Cs other than the selected end candidate Cs which is the object in the previous process, the marking area M of the band B extending continuously from the selected end candidate Cs is acquired for all the selected end candidates Cs. Thereafter, the marking area acquiring unit 15 excludes a marking area M of which the size does not satisfy a preset condition from the acquired marking areas M of the bands B. For example, the marking area acquiring unit 15 excludes a marking area M of which the width in the road width direction D1 is out of a predetermined length range and a marking area M of which the length in the road extending direction D2 is out of a predetermined length range from the acquired marking areas M of the bands B. Accordingly, it is possible to reduce noise due to erroneous detection of a marking other than the crosswalk marking Z. FIG. 10 illustrating marking areas M of which the size satisfies a preset condition out of the acquired marking areas M of the bands B is referred to as a marking area map P7.

Figure 11:
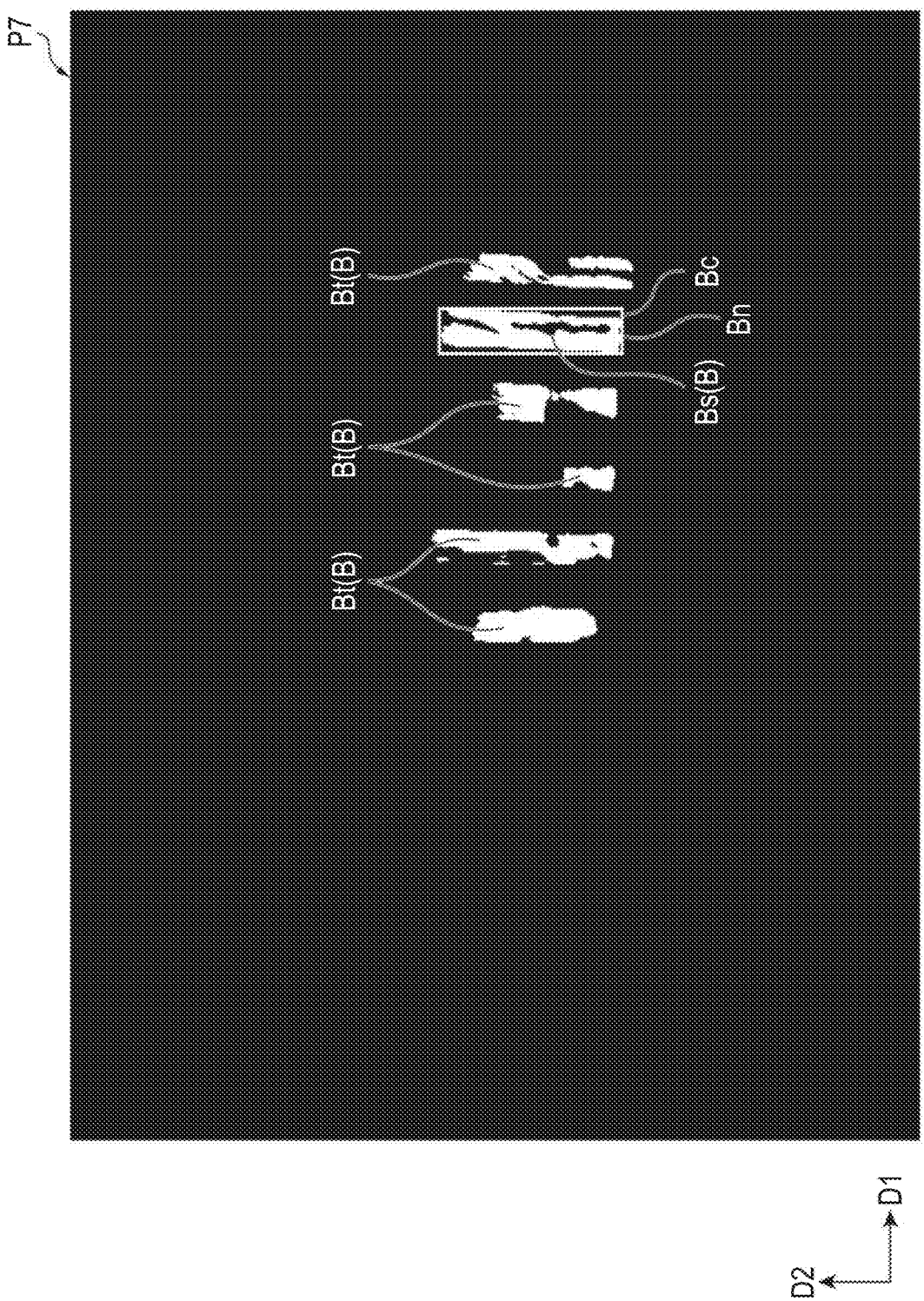
FIG. 11 is a diagram illustrating a complemented reference band.

The reference band selecting unit 16 selects a reference band Bs out of the bands B of which the marking area M has been acquired based on the lengths in the road extending direction D2 of the marking areas M acquired by the marking area acquiring unit 15 (see FIG. 11). The "reference band Bs" is a band B in which wear or the like is the least and the marking is marked most clearly out of the plurality of bands B. The position of the end Bn of the reference band Bs more accurately corresponds to the position of the edge Zn of the crosswalk marking Z in comparison with a non-reference band Bt. A "non-reference band Bt" is a band B other than the reference band Bs among the bands B. For example, the reference band selecting unit 16 selects a band B having a largest length in the road extending direction D2 of the marking area M out of the bands B as the reference band Bs. In this case, since the length in the road extending direction D2 of the marking area M of the second band B from the rightmost in the drawing out of the bands B illustrated in the marking area map P7 of FIG. 10 is the longest, the band B is selected as the reference band Bs. The reference band selecting unit 16 may select a band B in which a difference between the length in the road extending direction D2 of the marking area M thereof and an average value of the lengths in the road extending direction D2 of the marking areas M of all the bands B is within a predetermined range and the length in the road extending direction D2 of the marking area M is the largest out of the bands B as the reference band Bs. Alternatively, the reference band selecting unit 16 may select a band B in which the product of the length in the road extending direction D2 of the marking area M thereof and the length in the road width direction D1 thereof is the largest out of the bands B as the reference band Bs.

The band complementing unit 17 detects a position of the end Bn of the marking area M of the reference band Bs selected by the reference band selecting unit 16 and detects positions of the ends Bn of the marking areas M of the non-reference bands Bt. The band complementing unit 17 detects the positions of the ends Bn of the marking area M of the non-reference bands Bt, for example, based on the detected position of the end Bn of the marking area M of the reference band Bs.

At the time of detection of the positions of the ends Bn of the marking areas M of the reference bands Bs and the non-reference bands Bt, the band complementing unit 17 complements the marking areas M of the reference band Bs and the non-reference bands Bt (that is, the marking areas M which are partially worn down) and estimates complemented bands. A "complemented band Bc" is an original area (that is, an area before being worn down) of the band B which is estimated by complementing the marking area M of the band B (that is, the marking area M which is partially worn down). The band complementing unit 17 estimates the original area of each band B in a rectangular shape. The band complementing unit 17 may estimate the original area of a band B in a tetragonal shape (for example, a parallelogram and a trapezoid) other than the rectangular shape or in a shape (for example, a circle) other than the tetragonal shape.

Figure 12:
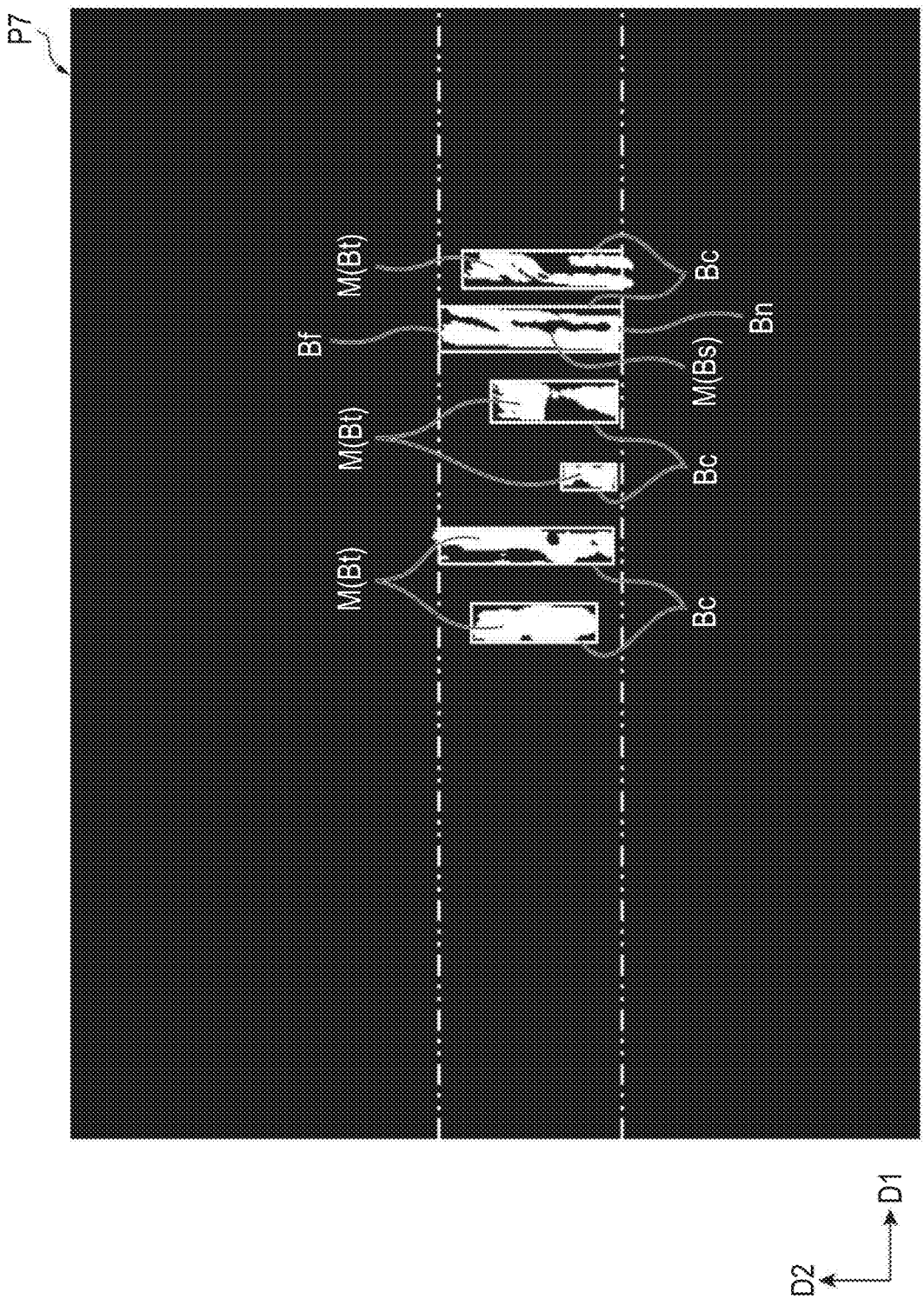
FIG. 12 is a diagram illustrating complemented bands.

An example of a process of detecting the positions of the ends Bn of the marking areas M of the reference bands Bs and the non-reference bands Bt using the band complementing unit 17 will be described below. FIG. 11 is a diagram illustrating a complemented reference band Bs. FIG. 12 is a diagram illustrating complemented bands Bc. As illustrated in FIGS. 11 and 12, the band complementing unit 17 creates a complemented band Bc circumscribing a reference band Bs selected by the reference band selecting unit 16 for the reference band Bs. The complemented band Bc of the reference band Bs has a rectangular shape in which the sides are parallel to the road width direction D1 or the road extending direction D2 and has a rectangular shape in which the sides circumscribe the marking area M of the band B.

Subsequently, the band complementing unit 17 extracts a reference band ROI in the road extending direction D2. The "reference band ROI" is an area between the end Bn and a far-side end Bf of the created complemented band Bc of the reference band Bs. In FIG. 12, the reference band ROI is an area which is close to two alternate long and two short dashes lines in the road extending direction D2. Among the plurality of bands B, the marking area M of the reference band Bs which is a band B in which wear or the like is the least and which are marked most clearly is estimated to be similar to the original area of the band B in comparison with the marking areas M of the non-reference bands Bt. Accordingly, even when an area other than the original area of a non-reference band Bt is erroneously detected to be the marking area M of the non-reference band Bt, it is possible to curb a decrease in estimation accuracy of the position of the edge Zn of the crosswalk marking Z due to the erroneous detection by setting the reference band ROI.

More specifically, the band complementing unit 17 creates a complemented band Bc that circumscribes an area in the reference band ROI in the road extending direction D2 of each non-reference band Bt for the non-reference band Bt. Here, the complemented band Bc of each non-reference band Bt has a rectangular shape in which the sides are parallel to the road width direction D1 or the road extending direction D2 similarly to the complemented band Bc of the reference band Bs. The band complementing unit 17 detects the positions of the ends Bn of the complemented bands Bc of the reference band Bs and the non-reference bands Bt to be positions of the ends Bn of the marking areas M of the reference band Bs and the non-reference bands Bt.

Figure 13:
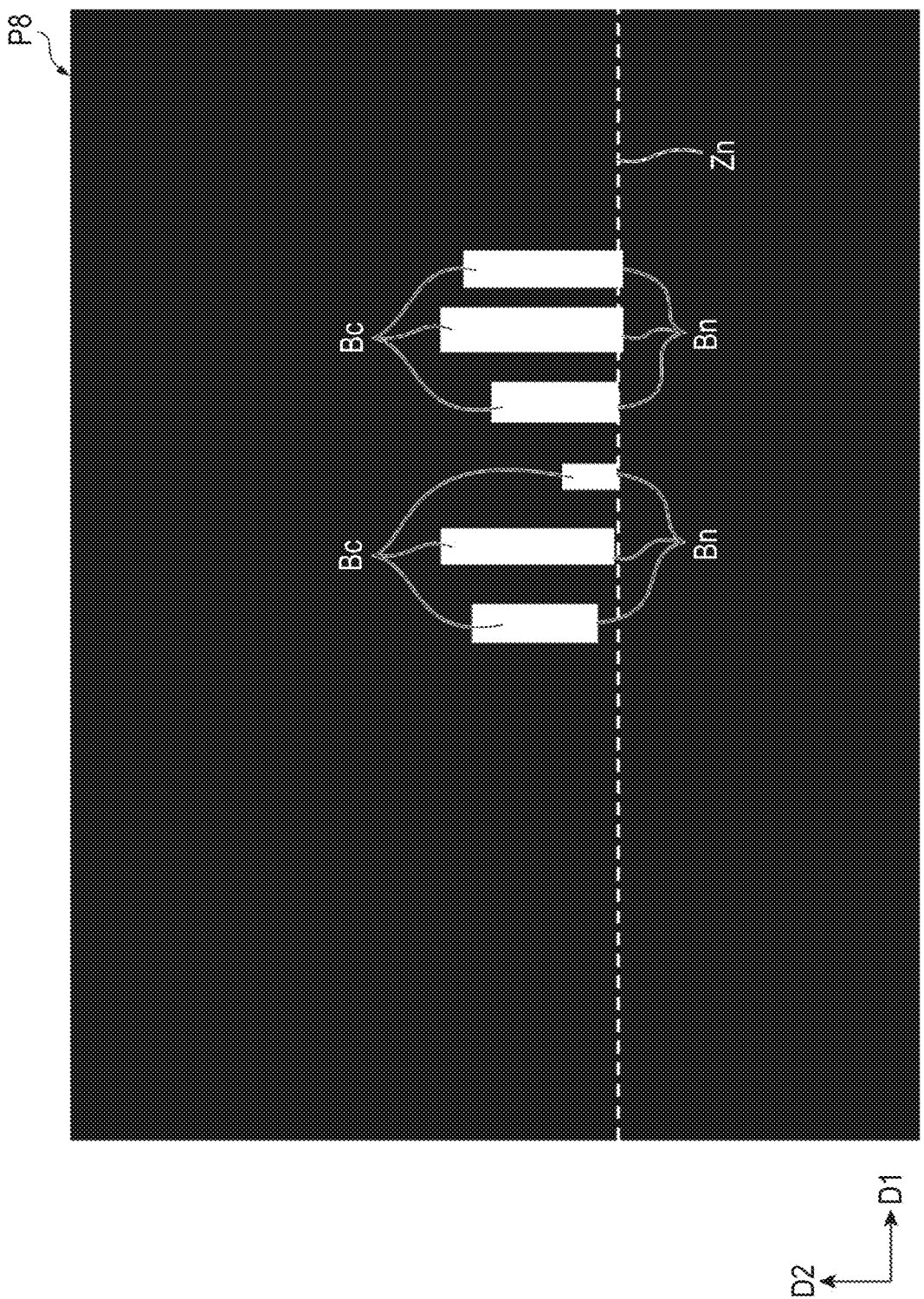
FIG. 13 is a diagram illustrating a position of an edge of a crosswalk marking estimated based on positions of ends of complemented bands.

The crosswalk edge estimating unit 18 estimates a position of the edge Zn of the crosswalk marking Z relative to the vehicle based on the selected end candidates Cs selected by the end candidate selecting unit 14 (for example, the positions in the road extending direction D2 of the selected end candidates Cs). More specifically, the crosswalk edge estimating unit 18 estimates a position of the edge Zn of the crosswalk marking Z relative to the vehicle based on the selected end candidate Cs of the reference band Bs selected by the reference band selecting unit 16 (for example, the positions of the selected end candidates Cs of the complemented bands Bc of the reference band Bs and the non-reference bands Bt). FIG. 13 is a diagram illustrating the position of the edge Zn of the crosswalk marking Z which has been estimated based on the positions of the ends Bn of the complemented bands Bc. In FIG. 13, the bands B in the marking area map P7 are complemented and are displayed as the complemented bands Bc. In the following description, FIG. 13 illustrating the complemented bands Bc is referred to as a complemented band map P8.

As illustrated in FIG. 13, the crosswalk edge estimating unit 18 acquires a median value of the positions of the ends Bn of the complemented bands Bc of the reference band Bs and the non-reference bands Bt and estimates a position corresponding to the median value to be the position of the edge Zn of the crosswalk marking Z. When the total number of the reference band Bs and the non-reference bands Bt is even, the crosswalk edge estimating unit 18 may estimate an average value of the positions of the ends Bn of the complemented bands Bc of two of the reference band Bs or the non-reference bands Bt with the median value interposed therebetween to be the position of the edge Zn of the crosswalk marking Z. In FIG. 13, the total number of the reference band Bs and the non-reference bands Bt is even. In FIG. 13, the average value of the positions of the ends Bn of the complemented bands Bc of the third and fourth bands B from the rightmost in the drawing is estimated to be the position of the edge Zn of the crosswalk marking Z.

Figure 14:
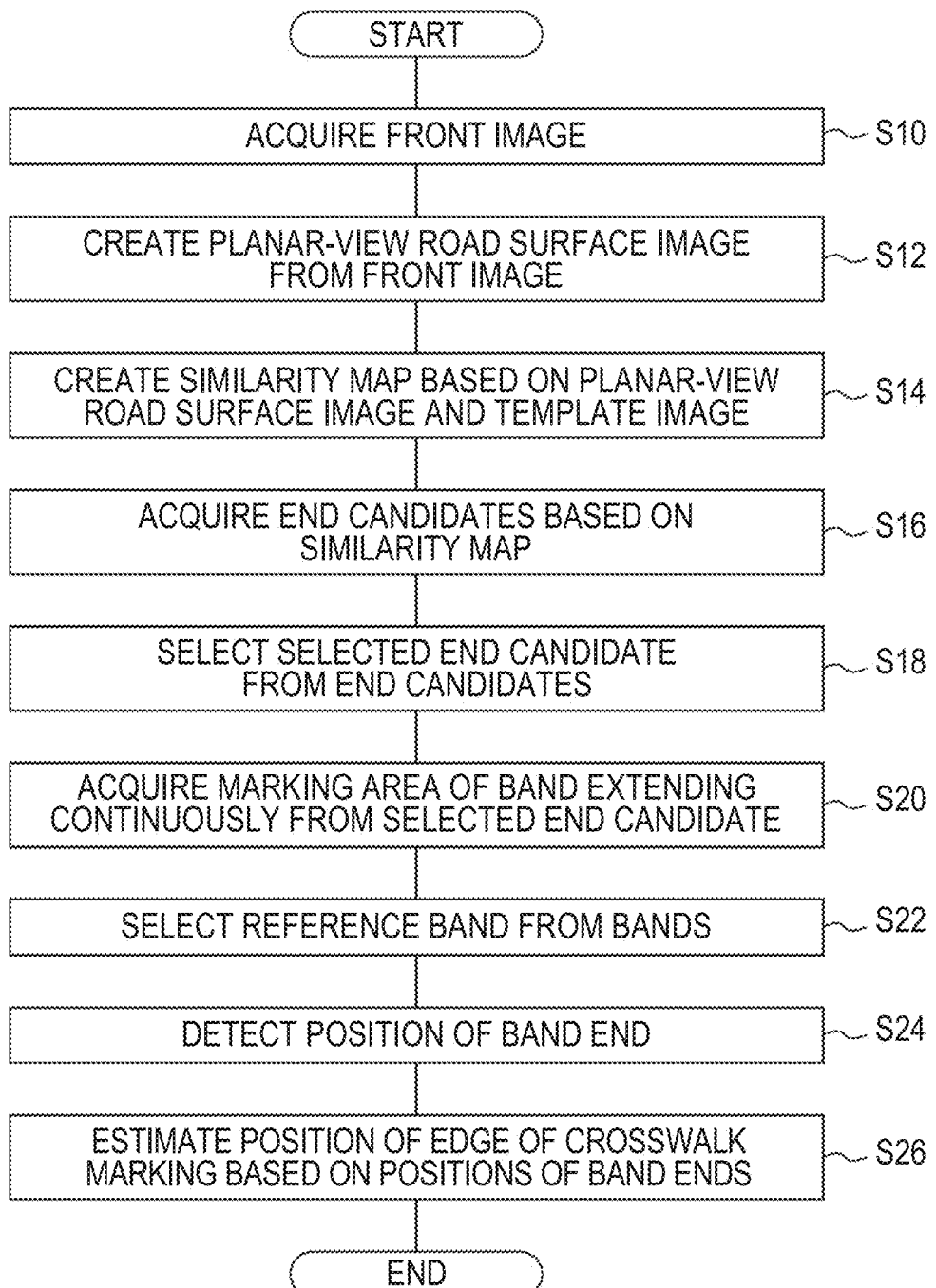
FIG. 14 is a flowchart illustrating a crosswalk edge estimating process according to the first embodiment.

A crosswalk edge estimating process which is performed by the crosswalk marking estimating device 1 according to the first embodiment will be described below. FIG. 14 is a flowchart illustrating the crosswalk edge estimating process according to the first embodiment.

As illustrated in FIG. 14, in Step S10, the crosswalk marking estimating device 1 receives imaging information in front of the vehicle from the camera using the surrounding image acquiring unit 11 and acquires an image P1 in front of the vehicle (see FIG. 2). Thereafter, the crosswalk marking estimating device 1 performs the process of Step S12.

In Step S12, the crosswalk marking estimating device 1 acquires the image P1 in front of the vehicle acquired by the camera from the surrounding image acquiring unit 11 using the planar-view road surface image creating unit 12 and creates a planar-view road surface image P2 in front of the vehicle based on the acquired image P1 (see FIG. 3). The planar-view road surface image creating unit 12 extracts a detection ROI from the created planar-view road surface image P2 of the road R in front of the vehicle. Thereafter, the crosswalk marking estimating device 1 performs the process of Step S14.

In Step S14, the crosswalk marking estimating device 1 acquires a similarity map P4 using the end candidate acquiring unit 13 by performing a known process such as template matching based on the planar-view road surface image P2 (see FIG. 3) and a template image P3 (see FIG. 4) for detecting ends Bn of bands B in the planar-view road surface image P2 (see FIG. 5). Thereafter, the crosswalk marking estimating device 1 performs the process of Step S16.

In Step S16, the crosswalk marking estimating device 1 acquires end candidates C based on the acquired similarity map P4 using the end candidate acquiring unit 13. More specifically, the end candidate acquiring unit 13 creates an end candidate map P5 in which an area in which the degree of similarity is equal to or greater than a preset threshold value remains by performing a threshold value process on the similarity map P4 (see FIG. 6). The end candidate acquiring unit 13 detects points at which the degree of similarity is a local maximum in the areas in which the degree of similarity is equal to or greater than a preset threshold value in the similarity map P4 (that is, areas which are marked in white in the end candidate map P5), and acquires the points as the end candidates C. Thereafter, the crosswalk marking estimating device 1 performs the process of Step S18.

In Step S18, the crosswalk marking estimating device 1 selects selected end candidates Cs from the grouping state in the road extending direction D2 of the end candidates C using the end candidate selecting unit 14 based on a distribution in the planar-view road surface image P2 of the end candidates C acquired by the end candidate acquiring unit 13. More specifically, the end candidate selecting unit 14 performs weighting of a normal distribution in the road extending direction D2 using a Gaussian kernel on the degrees of similarity of the end candidates C in the end candidate map p5 and acquires a histogram P6 by integrating the weighted values in the road width direction D1 (see FIG. 7). The end candidate selecting unit 14 divides the histogram P6 into sections of continuous parts and detects a section including a peak at which the vertex height is equal to or greater than a preset threshold value Th. The end candidate selecting unit 14 selects the end candidates C included in the detected section as the selected end candidates Cs (see FIG. 8). Thereafter, the crosswalk marking estimating device 1 performs the process of Step S20.

In Step S20, the crosswalk marking estimating device 1 acquires marking areas M of the bands B extending continuously from the selected end candidates Cs selected by the end candidate selecting unit 14 in the planar-view road surface image P2 using the marking area acquiring unit 15 (see FIGS. 9 and 10). More specifically, the marking area acquiring unit 15 sets a predetermined binarization target area A around each selected end candidate Cs. The marking area acquiring unit 15 sets a binarization threshold value based on the degree of similarity in each binarization target area A corresponding to one selected end candidate Cs set in the planar-view road surface image P2 for the binarization target area A and binarizes the entire planar-view road surface image P2 based on the binarization threshold value. Then, the marking area acquiring unit 15 acquires the marking area M of the band B extending continuously from the selected end candidate Cs which is an object in the current process. The marking area acquiring unit 15 performs the same process on the other selected end candidates Cs and acquires the marking areas M of the bands B extending continuously from the selected end candidates Cs for all the selected end candidates Cs. The marking area acquiring unit 15 excludes a marking area M in which the size does not satisfy a preset condition from the acquired marking areas M of the bands B and acquires the marking area map P7 (see FIG. 10). Thereafter, the crosswalk marking estimating device 1 performs the process of Step S22.

In Step S22, the crosswalk marking estimating device 1 selects a reference band Bs from the bands B based on the lengths in the road extending direction D2 of the marking areas M acquired by the marking area acquiring unit 15 using the reference band selecting unit 16. The reference band selecting unit 16 selects the band B in which the length in the road extending direction D2 of the marking area M is the longest out of the bands B as the reference band Bs (see FIG. 11). Thereafter, the crosswalk marking estimating device 1 performs the process of Step S24.

In Step S24, the crosswalk marking estimating device 1 detects the position of the end Bn (a band end) of the marking area M of the reference band Bs selected by the reference band selecting unit 16 using the band complementing unit 17 and detects the positions of the ends Bn (band ends) of the marking areas M of the non-reference bands Bt which are the bands B other than the reference band Bs among the bands B. More specifically, the band complementing unit 17 creates the complemented band Bc circumscribing the reference band for the reference band Bs (see FIG. 11). The band complementing unit 17 extracts a reference band ROI in the road extending direction D2 and creates the complemented bands Bc circumscribing the area in the reference band ROI in the road extending direction D2 out of the non-reference bands Bt for the non-reference bands Bt (see FIG. 12). Then, the band complementing unit 17 detects the positions of the ends Bn of the complemented bands Bc of the reference band Bs and the non-reference bands Bt as the positions of the ends Bn of the complemented bands Bc of the reference band Bs and the non-reference bands Bt. Thereafter, the crosswalk marking estimating device 1 performs the process of Step S26.

In Step S26, the crosswalk marking estimating device 1 estimates the position of the edge Zn of the crosswalk marking Z relative to the vehicle based on the positions in the road extending direction D2 of the selected end candidates Cs selected by the end candidate selecting unit 14 using the crosswalk edge estimating unit 18. More specifically, the crosswalk edge estimating unit 18 acquires a median value of the positions of the ends Bn of the complemented bands Bc of the reference band Bs and the non-reference bands Bt in the complemented band map P8 and estimates the position corresponding to the median value to be the position of the edge Zn of the crosswalk marking Z (see FIG. 13). When the position of the edge Zn of the crosswalk marking Z has been estimated, the crosswalk marking estimating device 1 ends the current process and restarts the crosswalk edge estimating process from Step S10.

As described above, with the crosswalk marking estimating device 1, the end candidates C for the bands B in the planar-view road surface image P2 are acquired based on the planar-view road surface image P2 of the road R around the vehicle and the template image P3 for detecting the ends Bn of the bands B. The selected end candidates Cs which are the end candidates C corresponding to the edge Zn of the crosswalk marking Z are selected from the grouping state in the road extending direction D2 of the end candidates C based on the distribution of the acquired end candidates C in the planar-view road surface image P2. The position of the edge Zn of the crosswalk marking Z relative to the vehicle is estimated based on the positions in the road extending direction D2 of the selected end candidates Cs. Here, in the edge Zn of the crosswalk marking Z, there are the ends Bn of a plurality of bands B in a narrow range in the road extending direction D2. Accordingly, even when erroneous parts other than the ends Bn of some bands B are erroneously detected as the end candidates C due to wear or the like, it is possible to appropriately select the selected end candidates Cs based on the grouping state of the end candidates C in the road extending direction D2 of the bands B. In this way, in the crosswalk marking estimating device 1, since the position of the edge Zn of the crosswalk marking Z relative to the vehicle is estimated using the selected end candidates Cs among the end candidates C of the bands B which are acquired using the template image P3 for detection, it is possible to curb a decrease in estimation accuracy of the position of the crosswalk marking Z even when the crosswalk marking Z is not clear.

The crosswalk marking estimating device 1 includes the marking area acquiring unit 15 that acquires the similar areas of the selected end candidates Cs extending continuously from the selected end candidates Cs in the planar-view road surface image P2 as the marking areas M of the bands B and the reference band selecting unit 16 that selects the reference band Bs out of the bands B of which the marking area M has been acquired based on the lengths in the road extending direction D2 of the marking areas M acquired by the marking area acquiring unit 15. The crosswalk edge estimating unit 18 estimates the position of the edge Zn of the crosswalk marking Z relative to the vehicle based on the selected end candidate Cs of the reference band Bs selected by the reference band selecting unit 16. Accordingly, in the crosswalk marking estimating device 1, the band B in which wear or the like is relatively little can be selected as the reference band Bs based on the lengths of the marking areas M which are the similar areas of the selected end candidates Cs extending continuously from the selected end candidates Cs. Accordingly, in the crosswalk marking estimating device 1, by estimating the position of the edge Zn of the crosswalk marking Z relative to the vehicle based on the selected end candidate Cs of the reference band Bs, it is possible to improve the estimation accuracy of the position of the crosswalk marking Z in comparison with a case in which the lengths of the marking areas M of the bands B are not considered.

Second Embodiment

A crosswalk marking estimating device 1 according to a second embodiment will be described below. The crosswalk marking estimating device 1 according to the second embodiment is different from the crosswalk marking estimating device 1 according to the first embodiment in that whether a crosswalk marking Z is a non-inclined crosswalk or an inclined crosswalk is determined based on the positions of the selected end candidates Cs selected by the end candidate selecting unit 14 and a specific method of estimating the position of the edge Zn of the crosswalk marking Z is selected based on the result of determination of whether the crosswalk marking Z is a non-inclined crosswalk or an inclined crosswalk, and both devices are the same in the other points. A "non-inclined crosswalk" is a crosswalk marking Z which is marked substantially perpendicular to the road extending direction D2. More specifically, the non-inclined crosswalk is a crosswalk marking Z in which a regression line of the positions of the selected end candidates Cs is not inclined by a predetermined angle or more with respect to the road width direction D1. An "inclined crosswalk" is a crosswalk marking Z which is marked inclined with respect to the road extending direction D2. More specifically, the inclined crosswalk is a crosswalk marking Z in which the regression line of the positions of the selected end candidates Cs is inclined by a predetermined angle or more with respect to the road width direction D1.

In the crosswalk marking estimating device 1 according to the second embodiment, the crosswalk edge estimating unit 18 determines whether a crosswalk marking Z is a non-inclined crosswalk or an inclined crosswalk by performing the following inclination determining process when the position of the edge Zn of the crosswalk marking Z is estimated based on the positions in the road extending direction D2 of the selected end candidates Cs selected by the end candidate selecting unit 14. FIG. 15 is a diagram illustrating an example of an inclined crosswalk. As illustrated in FIG. 15, the crosswalk edge estimating unit 18 calculates a regression line (a dotted line in the drawing) of the positions of the selected end candidates Cs selected from the end candidates C by the end candidate selecting unit 14. Then, the crosswalk edge estimating unit 18 acquires an inclination of the calculated regression line with respect to the road width direction D1 and determines whether the inclination is less than a preset inclination threshold value. The "inclination threshold value" is a threshold value in which a crosswalk marking Z is determined to be a non-inclined crosswalk when the calculated inclination of the regression line with respect to the road width direction D1 is less than the inclination threshold value and a crosswalk marking Z is determined to be an inclined crosswalk when the calculated inclination of the regression line with respect to the road width direction D1 is equal to or greater than the inclination threshold value. The inclination threshold value may be, for example, 3 degrees, 5 degrees, or 10 degrees.

When the calculated inclination of the regression line with respect to the road width direction D1 is less than the inclination threshold value, the crosswalk edge estimating unit 18 determines that the crosswalk marking Z is a non-inclined crosswalk. Then, the crosswalk edge estimating unit 18 estimates the position of the edge Zn of the crosswalk marking Z based on the positions in the road extending direction D2 of the selected end candidates Cs selected by the end candidate selecting unit 14 using the same method as in the crosswalk marking estimating device 1 according to the first embodiment.

On the other hand, when the calculated inclination of the regression line with respect to the road width direction D1 is equal to or greater than the inclination threshold value, the crosswalk edge estimating unit 18 determines that the crosswalk marking Z is an inclined crosswalk. Then, the crosswalk edge estimating unit 18 calculates a regression line of the positions of the ends Bn of the complemented bands Bc of the reference band Bs and the non-reference bands Bt and estimates the position of the edge Zn of the crosswalk marking Z based on the calculated regression line. For example, the crosswalk edge estimating unit 18 may estimate the position of the regression line of the positions of the ends Bn of the complemented bands Bc of the reference band Bs and the non-reference bands Bt to be the position of the edge Zn of the crosswalk marking Z.

Figure 16:
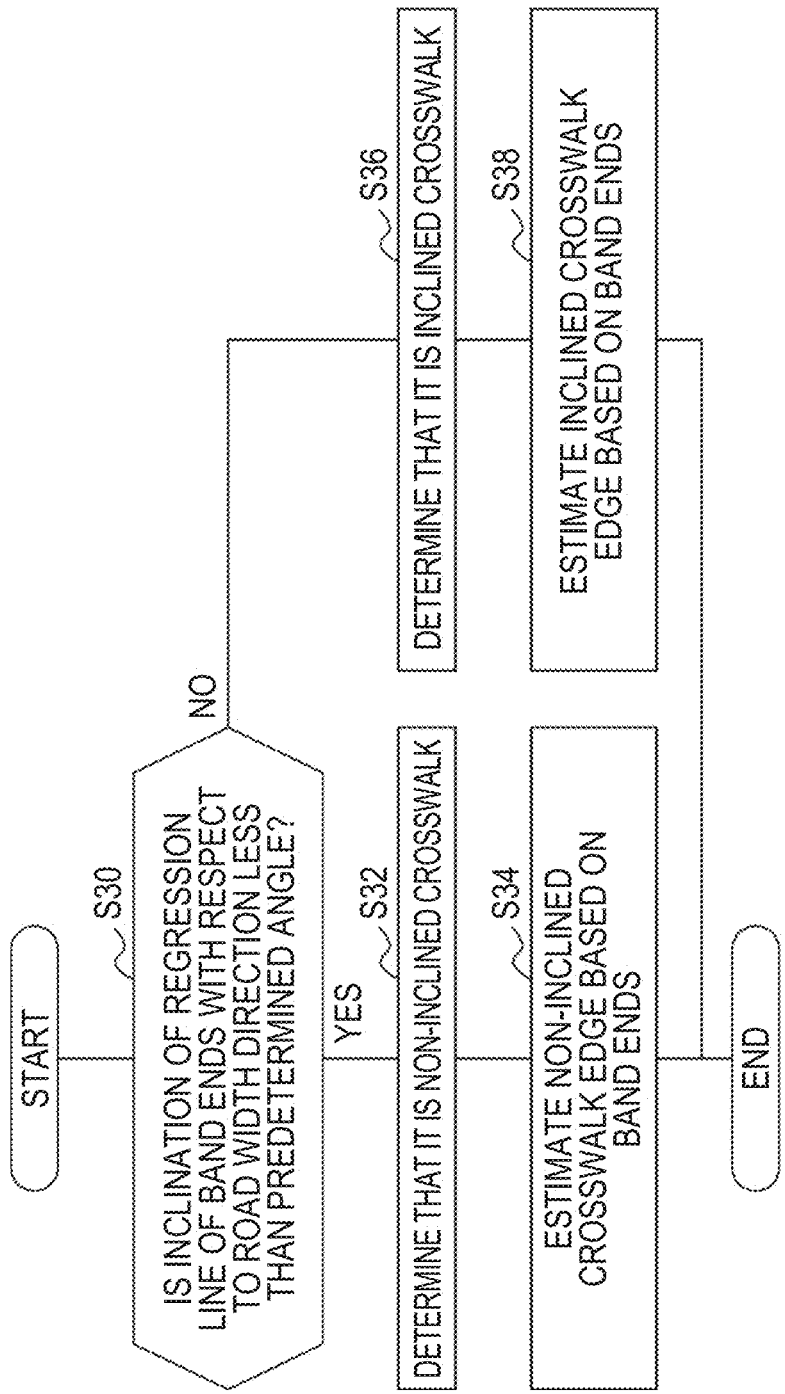
FIG. 16 is a flowchart illustrating a crosswalk edge estimating process according to a second embodiment.

A crosswalk edge estimating process which is performed by the crosswalk marking estimating device 1 according to the second embodiment will be described below. FIG. 16 is a flowchart illustrating the crosswalk edge estimating process according to the second embodiment. The flowchart illustrated in FIG. 16 corresponds to Step S26 of FIG. 14. That is, in the crosswalk edge estimating process which is performed by the crosswalk marking estimating device 1 according to the second embodiment, the crosswalk marking estimating device 1 first performs the processes of Steps S10 to S24 illustrated in FIG. 14 and then performs the process of Step S30 of FIG. 16.

As illustrated in FIG. 16, in Step S30, the crosswalk marking estimating device 1 calculates a regression line of the positions of the selected end candidates Cs selected from the end candidates C by the end candidate selecting unit 14 using the crosswalk edge estimating unit 18. Then, the crosswalk edge estimating unit 18 acquires an inclination of the calculated regression line with respect to the road width direction D1 and determines whether the acquired inclination is less than a preset inclination threshold value. When the inclination of the calculated regression line with respect to the road width direction D1 is less than the inclination threshold value (YES in Step S30), the crosswalk marking estimating device 1 performs the process of Step S32. On the other hand, when the inclination of the calculated regression line with respect to the road width direction D1 is equal to or greater than the inclination threshold value (NO in Step S30), the crosswalk marking estimating device 1 performs the process of Step S36.

In Step S32, the crosswalk marking estimating device 1 determines that the crosswalk marking Z is a non-inclined crosswalk using the crosswalk edge estimating unit 18. Thereafter, the crosswalk marking estimating device 1 performs the process of Step S34.

In Step S34, the crosswalk marking estimating device 1 estimates the position of the edge Zn of the crosswalk marking Z based on the positions in the road extending direction D2 of the selected end candidates Cs selected by the end candidate selecting unit 14 using the crosswalk edge estimating unit 18. More specifically, the crosswalk edge estimating unit 18 acquires a median value of the positions of the ends Bn of the complemented bands Bc of the reference band Bs and the non-reference bands Bt and estimates the position corresponding to the median value to be the position of the edge Zn of the crosswalk marking Z (see FIG. 13). When the position of the edge Zn of the crosswalk marking Z has been estimated, the crosswalk marking estimating device 1 ends the current process and restarts the crosswalk edge estimating process from Step S10 in FIG. 14.

In Step S36, the crosswalk marking estimating device 1 determines that the crosswalk marking Z is an inclined crosswalk using the crosswalk edge estimating unit 18. Thereafter, the crosswalk marking estimating device 1 performs the process of Step S38.

In Step S38, the crosswalk marking estimating device 1 calculates a regression line of the positions of the ends Bn of the complemented bands Bc of the reference band Bs and the non-reference bands Bt and estimates the position of the edge Zn of the crosswalk marking Z based on the calculated regression line using the crosswalk edge estimating unit 18 (see FIG. 15). For example, the crosswalk edge estimating unit 18 may estimate the position of the regression line of the positions of the ends Bn of the complemented bands Bc of the reference band Bs and the non-reference bands Bt to be the position of the edge Zn of the crosswalk marking Z. When the position of the edge Zn of the crosswalk marking Z has been estimated, the crosswalk marking estimating device 1 ends the current process and restarts the crosswalk edge estimating process from Step S10 in FIG. 14.

As described above, with the crosswalk marking estimating device 1 according to the second embodiment, the same operations and advantages as in the crosswalk marking estimating device 1 according to the first embodiment can be achieved. With the crosswalk marking estimating device 1 according to the second embodiment, it is determined whether the crosswalk marking Z is a non-inclined crosswalk or an inclined crosswalk and a specific method of estimating the position of the edge Zn of the crosswalk marking Z is selected based on the result of determination of whether the crosswalk marking Z is a non-inclined crosswalk or an inclined crosswalk. Accordingly, with the crosswalk marking estimating device 1 according to the second embodiment, since an appropriate estimation method can be employed based on whether the crosswalk marking Z is a non-inclined crosswalk or an inclined crosswalk, it is possible to further curb a decrease in estimation accuracy of a position of a crosswalk marking even when the crosswalk marking is not clear.

MODIFIED EXAMPLES

The above-mentioned embodiments can be subjected to various modifications and improvements and be embodied in various forms based on knowledge of those skilled in the art.

For example, in the first and second embodiments, in the histogram P6 obtained by performing weighting of a normal distribution in the road extending direction D2 using a Gaussian kernel on the degrees of similarity of the end candidates C and integrating the weighted values in the road width direction D1, the end candidate selecting unit 14 may set the position in the road extending direction D2 which has a peak equal to or greater than a threshold value Th as a candidate position for the edge Zn of the crosswalk marking Z.

In the first and second embodiments, in the histogram P6 obtained by performing weighting of a normal distribution in the road extending direction D2 using a Gaussian kernel on the degrees of similarity of the end candidates C and integrating the weighted values in the road width direction D1, the end candidate selecting unit 14 may set the position in the road extending direction D2 having a maximum value as the position of the edge Zn of the crosswalk marking Z.

In the first and second embodiments, the crosswalk marking Z of which the position can be estimated by the crosswalk marking estimating device 1 is not limited to a marking which is marked in front of the vehicle and may be marked, for example, in back of the vehicle or aside the vehicle as long as it is marked around the vehicle.

In the first and second embodiments, the edge in the road extending direction D2 of the crosswalk marking Z of which the position can be estimated by the crosswalk marking estimating device 1 is not limited to the near-side edge Zn (a one-side edge Zn) in the road extending direction D2 of the crosswalk marking Z and may be a far-side edge Zf (a one-side edge Zf) in the road extending direction D2 of the crosswalk marking Z. In this case, the end candidates C are candidates for the far-side ends Bf in the road extending direction D2 of the bands B, and the template image P3 is for detecting the far-side ends Bf in the road extending direction D2 of the bands B.

In the first and second embodiments, the crosswalk edge estimating unit 18 may estimate the position of the near-side edge Zn in the road extending direction D2 of the crosswalk marking Z based on the near-side ends Bn in the road extending direction D2 of the complemented bands Bc and estimate the far-side edge Zf in the road extending direction D2 of the crosswalk marking Z based on the positions of the far-side ends Bf in the road extending direction D2 of the same complemented bands Bc.

In the first and second embodiments, the external sensor 2 may be, for example, a radar sensor. The radar sensor is a detection device that detects an object near the vehicle using radiowaves (for example, millimeter waves) or light. Examples of the radar sensor include a millimeter wave radar and a light detection and ranging (LIDAR). The radar sensor detects an object by transmitting radio waves or light to the surroundings of the vehicle and receiving radio waves or light reflected from the object. The radar sensor transmits the detected object information to the crosswalk edge estimation ECU 10. Examples of the object include a moving object and a stationary object. Examples of the moving object include a pedestrian, a bicycle, and another vehicle. Examples of the stationary object include a utility pole, a building, and a traffic sign. Examples of the stationary object include road markings such as a crosswalk marking Z near the vehicle. When the external sensor 2 is a radar sensor, for example, a road marking near the vehicle such as a crosswalk marking Z recognized by the radar sensor may be acquired as a map and the same process as in the above-mentioned embodiments may be performed on the acquired map of road markings.

In the first and second embodiments, the planar-view road surface image creating unit 12 may not extract an area including the crosswalk marking Z as a detection ROI from the created planar-view road surface image P2 of the road R in front of the vehicle. That is, the crosswalk marking estimating device 1 may perform a process of acquiring the end candidates C using the end candidate acquiring unit 13 on the entire planar-view road surface image P2 created by the planar-view road surface image creating unit 12.

In the first and second embodiments, the band complementing unit 17 may not extract a reference band ROI in the road extending direction D2 for the complemented band Bc of the created reference band Bs. In this case, the band complementing unit 17 may create a complemented band Bc circumscribing each non-reference band Bt for all the non-reference bands Bt.

In the first and second embodiments, the crosswalk edge estimating unit 18 has only to estimate the position of the edge Zn of the crosswalk marking Z based on the positions in the road extending direction D2 of the selected end candidates Cs, and may not estimate the position of the edge Zn of the crosswalk marking Z based on the positions of the ends Bn of the complemented bands Bc of the reference band Bs and the non-reference bands Bt. For example, the crosswalk edge estimating unit 18 may estimate the average position in the road extending direction D2 of the selected end candidates Cs as the position of the edge Zn of the crosswalk marking Z.

In the first and second embodiments, the crosswalk marking estimating device 1 may not include the marking area acquiring unit 15, the reference band selecting unit 16, and the band complementing unit 17. In this case, the crosswalk marking estimating device 1 can estimate the position of the edge Zn of the crosswalk marking Z based on the positions in the road extending direction D2 of the selected end candidates Cs selected by the end candidate selecting unit 14.

In the first and second embodiments, when the edges Zn of a plurality of crosswalk markings Z have been detected by the crosswalk marking estimating device 1, the crosswalk marking estimating device 1 may preferentially handle the nearest-side edge Zn in the road extending direction D2.

Figure 17:
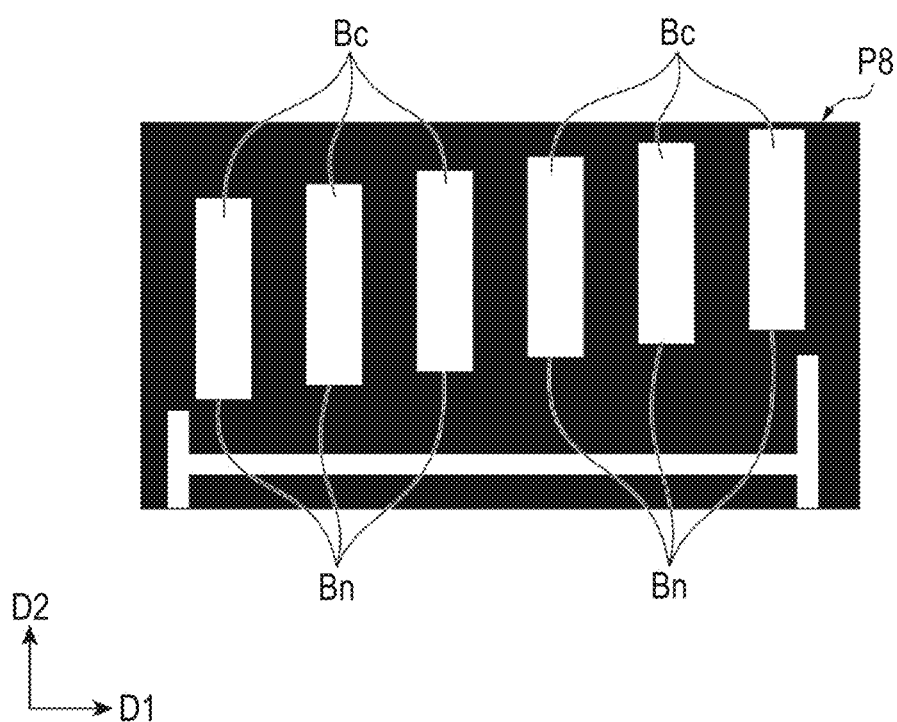
FIG. 17 is a diagram illustrating another example of an inclined crosswalk.
Figure 18:
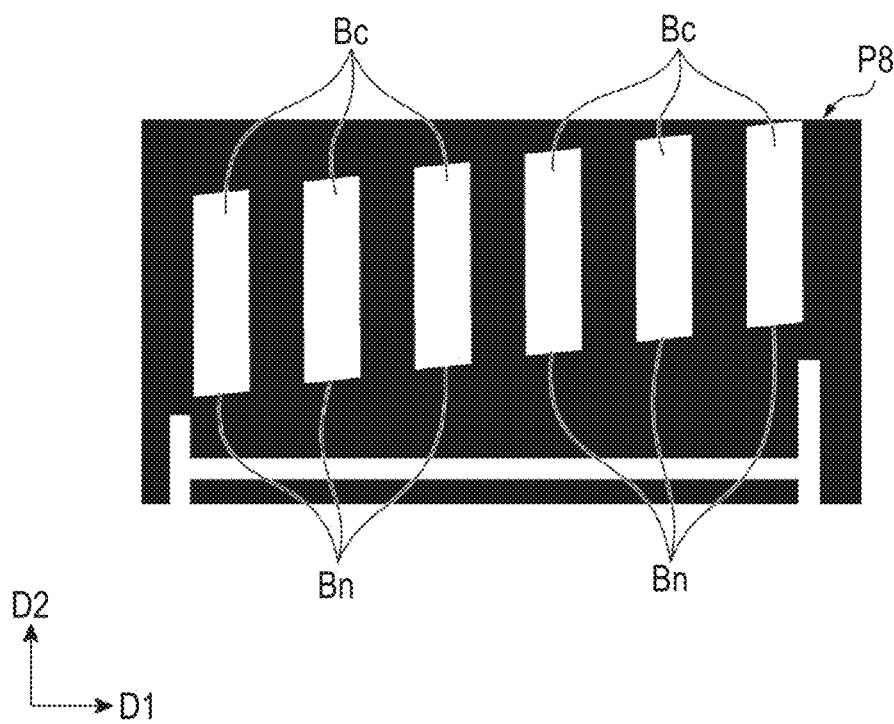
FIG. 18 is a diagram illustrating another example of an inclined crosswalk.

In the second embodiment, even when the crosswalk marking Z which is an inclined crosswalk is not marked in the aspect illustrated in FIG. 15, the same operations and advantages as in the crosswalk marking estimating device 1 according to the second embodiment can be achieved. FIGS. 17 and 18 are diagrams illustrating other examples of an inclined crosswalk. For example, as illustrated in FIG. 17, even when the position of an edge Zn of a crosswalk marking Z is disposed in a line shape, the same operations and advantages as in the crosswalk marking estimating device 1 according to the second embodiment can be achieved. As illustrated in FIG. 18, even when sides of the edge Zn of bands B of a crosswalk marking Z are marked on the road R to be inclined with respect to the road width direction D1, the same operations and advantages as in the crosswalk marking estimating device 1 according to the second embodiment can be achieved.

A crosswalk marking estimating device according to an aspect of the present disclosure estimates a position of a crosswalk marking including a plurality of bands. The crosswalk marking estimating device includes circuitry configured to: create a planar-view road surface image of a road around a vehicle based on a result of detection from an onboard sensor; acquire end candidates which are candidates for ends of the bands in the planar-view road surface image based on the planar-view road surface image and a template image which is stored in advance, the template image being a model image of ends on one side, in a road extending direction, of the bands included in the crosswalk marking; select a plurality of selected end candidates which is a set of the end candidates corresponding to an edge on the one side, in the road extending direction, of the crosswalk marking from a distribution of the end candidates in the road extending direction in the planar-view road surface image; and estimate a position of the edge of the crosswalk marking relative to the vehicle based on the selected end candidates.

In the edge of the crosswalk marking, there are ends of a plurality of bands in a narrow range in the road extending direction. According to the above aspect even when erroneous parts other than ends of some bands are erroneously detected as end candidates due to wear or the like, it is possible to appropriately select a selected end candidate based on the grouping state of the end candidates in the road extending direction of the bands. In this way, in the crosswalk marking estimating device, since the position of the edge of the crosswalk marking relative to the vehicle is estimated using the selected end candidate among the end candidates of the bands which are acquired using the template image for detection, it is possible to curb a decrease in estimation accuracy of a position of a crosswalk marking even when the crosswalk marking is not clear.

In the aspect, the circuitry may be configured to acquire, as marking areas of the bands, similar areas of the selected end candidates each of which extends continuously from each of the selected end candidates in the planar-view road surface image; select a reference band, based on lengths in the road extending direction of the marking areas, from the bands of which the marking areas have been acquired; and estimate a position of the edge of the crosswalk marking relative to the vehicle based on one of the selected end candidates, the one of the selected end candidates corresponding to the reference band.

According to the above configuration, in the crosswalk marking estimating device, a band having relatively little wear or the like can be selected as a reference band based on the length of the marking area which is a similar area of the selected end candidate extending continuously from the selected end candidate. Accordingly, with the crosswalk marking estimating device, it is possible to improve estimation accuracy of the position of the crosswalk marking by estimating a position of the edge of the crosswalk marking relative to the vehicle based on the selected end candidate of the reference band in comparison with a case in which the length of the marking area of each band is not considered.

What is claimed is:

1. A crosswalk marking estimating device estimating a position of a crosswalk marking including a plurality of bands, the crosswalk marking estimating device comprising circuitry configured to:
    create a planar-view road surface image of a road around a vehicle based on a result of detection from an onboard sensor;
    acquire end candidates which are candidates for ends of the bands in the planar-view road surface image based on the planar-view road surface image and a template image which is stored in advance, the template image being a model image of ends on one side, in a road extending direction, of the bands included in the crosswalk marking;
    select a plurality of selected end candidates which is a set of the end candidates corresponding to an edge on the one side, in the road extending direction, of the crosswalk marking from a distribution of the end candidates in the road extending direction in the planar-view road surface image; and
    estimate a position of the edge of the crosswalk marking relative to the vehicle based on the selected end candidates.

2. The crosswalk marking estimating device according to claim 1, wherein the circuitry is configured to acquire, as the end candidates, points at which a degree of similarity to the template image is a local maximum in the planar-view road surface image.

3. The crosswalk marking estimating device according to claim 1, wherein the circuitry is configured to:
    divide the planar-view road surface image into a plurality of sections based on the distribution; and
    acquire, as the selected end candidates, all of end candidates included in a section including an end candidate of which a degree of similarity is greater than a threshold value.

4. The crosswalk marking estimating device according to claim 1, wherein the circuitry is configured to:
    acquire, as marking areas of the bands, similar areas of the selected end candidates each of which extends continuously from each of the selected end candidates in the planar-view road surface image;
    select a reference band, based on lengths in the road extending direction of the marking areas, from the bands of which the marking areas have been acquired; and
    estimate the position of the edge of the crosswalk marking relative to the vehicle based on one of the selected end candidates, the one of the selected end candidates corresponding to the reference band.

5. The crosswalk marking estimating device according to claim 4, wherein a predetermined parameter of an image of each of the similar areas is similar to the predetermined parameter of each of the selected end candidates.

6. The crosswalk marking estimating device according to claim 5, wherein the predetermined parameter includes at least one of a luminance, a hue, a lightness, and a saturation.

* * * * *